(12) United States Patent
Wetherill et al.

(10) Patent No.: US 11,579,061 B2
(45) Date of Patent: Feb. 14, 2023

(54) FLUID EFFICIENCY OF A FLUID

(71) Applicant: IoT Diagnostics, Cincinnati, OH (US)

(72) Inventors: Rex Wetherill, Cincinnati, OH (US);
Jeremy Drury, Cincinnati, OH (US);
Jon Prescott, Lexington, KY (US)

(73) Assignee: IoT Diagnostics, Cincinnati, OH (US)

( * ) Notice: Subject to any disclaimer, the term of this patent is extended or adjusted under 35 U.S.C. 154(b) by 330 days.

(21) Appl. No.: 16/675,931

(22) Filed: Nov. 6, 2019

(65) Prior Publication Data

US 2020/0141850 A1    May 7, 2020

Related U.S. Application Data

(60) Provisional application No. 62/756,278, filed on Nov. 6, 2018.

(51) Int. Cl.
*G01N 11/02* (2006.01)
*G06N 3/02* (2006.01)
*G01N 11/00* (2006.01)

(52) U.S. Cl.
CPC ...... *G01N 11/02* (2013.01); *G01N 2011/0066* (2013.01); *G06N 3/02* (2013.01)

(58) Field of Classification Search
CPC .. G01N 11/02; G01N 2011/0066; G01N 3/56; G06N 3/02
USPC ........... 73/53.01, 53.05–53.07, 54.01, 61.42, 73/61.43–61.59, 61.71–61.75, 86, 168, (Continued)

(56) References Cited

U.S. PATENT DOCUMENTS

| | | | | |
|---|---|---|---|---|
| 7,581,434 B1 * | 9/2009 | Discenzo | ........... | G01N 33/2888 73/53.01 |
| 7,735,362 B2 * | 6/2010 | DeNatale | ........... | G01N 33/2888 73/114.55 |
| 2010/0300683 A1 | 12/2010 | Looper et al. | | |

(Continued)

FOREIGN PATENT DOCUMENTS

WO    2018089299 A1    5/2018

OTHER PUBLICATIONS

International Search Report; International Searching Authority; International Application No. PCT/US2019/060066; dated Jan. 15, 2020; 2 pages.

(Continued)

*Primary Examiner* — Robert R Raevis
(74) *Attorney, Agent, or Firm* — Taft Stettinius & Hollister LLP

(57) ABSTRACT

Systems and method determine a fluid efficiency of a fluid that flows through a fluid power system. Characteristics of the fluid is monitored in real-time as the fluid flows through the fluid monitoring device that is coupled to the fluid power system as the fluid flows through the fluid power system. A fluid status is determined in real-time that is associated with fluid parameters of the fluid that is determined from the fluid parameters detected by the fluid monitoring device. The fluid status of the fluid is determined in real-time when the fluid status indicates that a corrective action is to be executed to increase a quality of the fluid and an assessment of the corrective action that is to be executed is generated based on the fluid parameters. Degradation of the components of the fluid power system increases without the corrective action being executed to the fluid.

25 Claims, 4 Drawing Sheets

(58) Field of Classification Search
USPC ........ 73/865.5, 866, 432.1, 7; 340/627, 631; 417/63
See application file for complete search history.

(56) References Cited

U.S. PATENT DOCUMENTS

| | | |
|---|---|---|
| 2013/0240045 A1 | 9/2013 | Feng |
| 2015/0301534 A1 | 10/2015 | Aughton |
| 2016/0018382 A1* | 1/2016 | Worden ............. G01N 33/2888 73/53.05 |
| 2018/0207648 A1 | 7/2018 | Stull et al. |

OTHER PUBLICATIONS

Written Opinion of the International Searching Authority, International Searching Authority; International Application No. PCT/US2019/060066; dated Jan. 15, 2020; 6 pages.

PANOV. "Distributed network system for real-time model based control of industrial gas turbines." In: ASME 2011 Turbo Expo: Turbine Technical Conference and Exposition. Jan. 2011 from https://www.researchgate.net/profileNili_Panov/publication/267620244_Distributed_Network_System_for_Real-TimeModel_Based_Control_of_Industrial_Gas_Turbines/links/559ee9b208ae03c44a5cde05/Distributed-Network-System-for-Real-Time-Model-Based-Control-of-IndustrialGas-Turbines.pdf.

* cited by examiner

FLUID EFFICIENCY OF A FLUID

CROSS-REFERENCE TO RELATED APPLICATIONS

This application claims the benefit of U.S. Provisional Application No. 62/756,278 filed on Nov. 6, 2018, which is incorporated herein by reference in its entirety.

FIELD OF THE INVENTION

The present invention relates generally to fluid circuits and, more particularly, to generating the operating condition of a fluid in the fluid circuit.

BACKGROUND OF THE INVENTION

Industrial systems often times utilize fluid power systems to perform work, such as, to run hydraulic motors or to extend and retract cylinders in various manufacturing or production environments, for example. These fluid power systems include fluids, such as hydraulic fluid, to maneuver the components of the fluid power system, such as the machine, in executing the desired work. As the fluid pushes through the fluid power system as the fluid power system executes the desired work, a fluid status of the fluid may deviate as the fluid may be tainted with numerous types of impacts from the fluid power system. For example, the particle count of the particles included in the fluid may increase as the fluid power system operates and an increase in particles in the fluid may impact the performance of the fluid power system as well as cause wear and/or damage to the components of the fluid power system should the fluid not be treated for the increase of particles included in the fluid. In performing corrective action to the fluid to improve the fluid status of the fluid, the efficiency in which the fluid power system operates increases as well as prevents and/or slows down the mechanical wear of several of the components of the fluid power system. Corrective action to the fluid may be any type of action that addresses the fluid parameters of the fluid that are negatively impacting the fluid status of the fluid. However, a failure to implement the corrective action to adequately address the fluid parameters that are negatively impacting the fluid status of the fluid may result in the components of the fluid power system to eventually fail if the quality of the fluid is not increased.

Failure of the fluid power system can have catastrophic consequences. For example, if a pump included in the fluid power system abruptly fails, substantial debris can be introduced into the system causing damage to downstream components. In addition, catastrophic failures can result in substantial disruption of the manufacturing process. In view of the consequences of failure in components of the fluid power system, it is desirable to determine in real-time when the fluid status of the fluid indicates that a corrective action is to be executed to increase the quality of the fluid and to execute the corrective action to increase the quality of the fluid. In increasing the quality of the fluid when the fluid status of the fluid is negatively impacted by various fluid parameters, the quality of the fluid may be adequately increased, thus avoiding a major disruption in production.

One problem, however, is how to objectively determine how to evaluate the quality of the fluid. Generally, preventive maintenance schedules are developed from past experience and are subjective. Because fluid wear cannot be easily monitored during operation, the decline in the performance of the fluid to adequately improve the quality of the fluid may not be easily predicted. In this regard, the fluid parameters of the fluid that are negatively impacting the fluid status of the fluid continue to have an increased negative impact on the fluid. The quality of the fluid may continue to decrease as the fluid parameters negatively impacting the fluid status of the fluid remain unchecked. By determining the fluid parameters that are negatively impacting the fluid status of the filter and in turn determining corrective actions to be executed to remedy the fluid parameters negatively impacting the fluid, the appropriate corrective actions may then be executed to increase the quality of the fluid before a decrease in the performance in the fluid power system occurs and/or the components of the fluid power system suffer wear and/or damage.

SUMMARY OF THE INVENTION

The present invention overcomes the foregoing and other shortcomings and drawbacks of known fluid monitoring devices for use in fluid circuits. While the invention will be described in connection with certain embodiments, it will be understood that the invention is not limited to these embodiments. On the contrary, the invention includes all alternatives, modifications and equivalents as may be included within the spirit and scope of the present invention.

In accordance with the principles of the present invention, a computer implemented method determines a fluid efficiency of a fluid that flows through a fluid power system. A plurality of characteristics of a fluid is monitored on a flow path of a fluid monitoring device that is coupled to the fluid power system. The flow path is a path that the fluid flows through the fluid monitoring device that is coupled to the fluid power system as the fluid flows through the fluid power system. A fluid status is determined in real-time that is associated with a plurality of fluid parameters of the fluid as the fluid flows through the flow path of the fluid monitoring device that is determined from the plurality of fluid parameters detected by the fluid monitoring device. The fluid status of the fluid is determined when the fluid status of the fluid indicates that a corrective action is to be executed to increase a quality of the fluid and an assessment is generated of the corrective action that is to be executed based on the fluid parameters detected by the fluid monitoring device. Degradation to the components of the fluid power system increases as the fluid flows through the fluid power system without the corrective action being executed to the fluid.

According to another aspect of the present invention, a system for determining a fluid efficiency of a fluid that flows through a fluid power system includes a fluid monitoring device and fluid computing device. The fluid monitoring device is coupled to the fluid power system. The fluid monitoring device is configured to monitor in real-time a plurality of characteristics of a fluid on a flow path of the fluid monitoring device as the fluid flows through the fluid power system. A fluid computing device is configured to determine a status in real-time that is associated with a plurality of fluid parameters of the fluid as the fluid flows through the flow path of the fluid monitoring device that is determined from the plurality of fluid parameters detected by the fluid monitoring device. The fluid computing device is also configured to determine in real-time when the fluid status of the fluid indicates that a corrective action is to be executed to increase a quality of the fluid and generate an assessment of the corrective action that is to be executed based on the fluid parameters detected by the fluid monitoring device. The degradation to components of the fluid power system increases as the fluid flows through the fluid power system without the corrective action being executed to the fluid.

The above and other objectives and advantages of the present invention shall be made apparent from the accompanying drawings and description thereof.

BRIEF DESCRIPTION OF THE DRAWINGS

The accompanying drawings, which are incorporated in and constitute a part of this specification, illustrate an embodiment of the invention and, together with a general description of the invention given above, and the detailed description of the embodiments given below, serve to explain the principles of the invention.

DETAILED DESCRIPTION OF THE INVENTION

Figure 1:
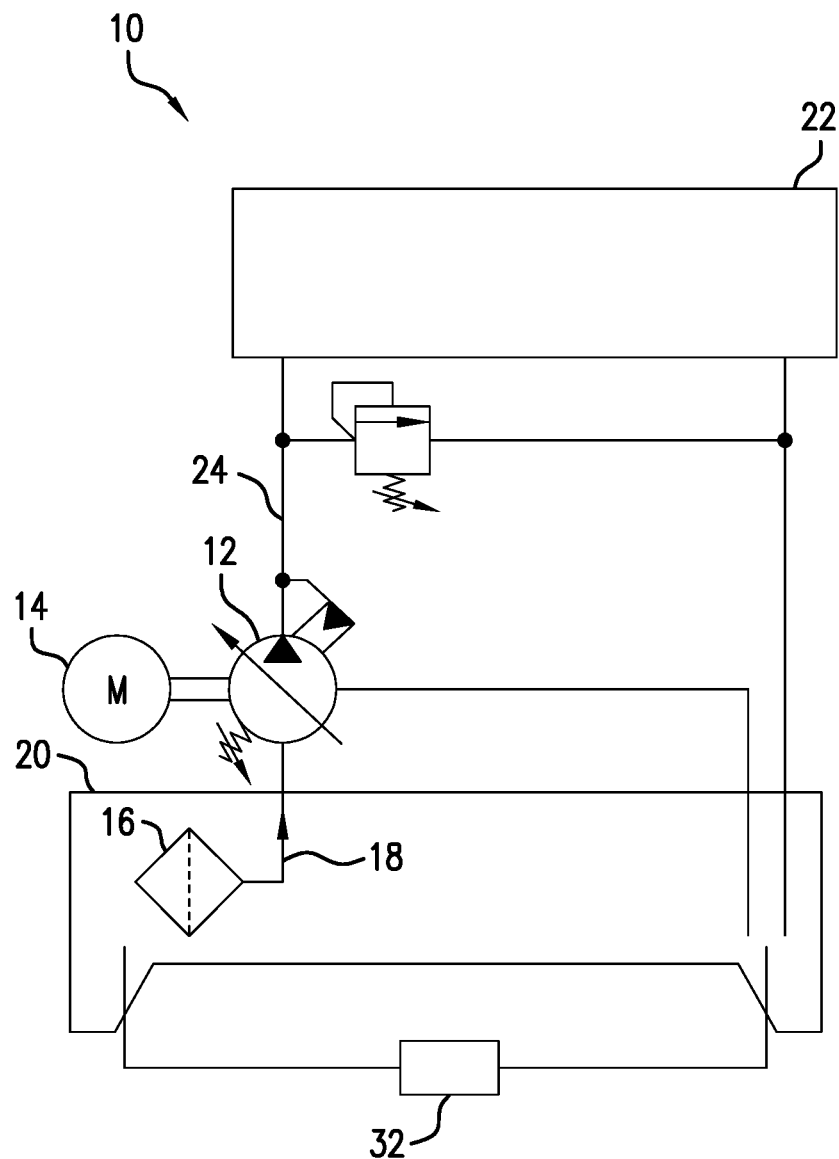
FIG. 1 is a schematic view of a fluid power system according to one embodiment of the invention.

In the Detailed Description herein, references to "one embodiment", "an embodiment", an "example embodiment", etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure, or characteristic is described in connection with an embodiment of the present invention, Applicants submit that it may be within the knowledge of one skilled in the art to affect such feature, structure, or characteristic in connection with other embodiments of the present invention whether or not explicitly described.

Embodiments of the present invention may be implemented in hardware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

For purposes of this discussion, each of the various components discussed can be considered a module, and the term "module" shall be understood to include at least one software, firmware, and hardware (such as one or more circuit, microchip, or device, or any combination thereof), and/or any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further components within a module can be in a single device or distributed among multiple devices in a wired or wireless manner.

The following detailed description refers to the accompanying drawings that illustrate exemplary embodiments of the present invention. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the detailed description is not meant to limit the present invention to the embodiments described below.

With reference to FIG. 1, an exemplary fluid power system 10 is depicted. In this example, the fluid power system 10 may include a variable speed hydraulic pump 12 powered by a motor 14. During operation, the pump 12 may draw fluid through a fluid filter 16 and suction line 18 from a tank 20. The fluid filter 16 may then remove particles included in the fluid based on the pores and other components of the fluid filter 16 such that the particles are captured in the pores and other components of the fluid filter 16 and thereby removed from the fluid as the fluid continuously flows out of the fluid filter 16 via the output port 120.

The fluid that flows through the fluid power system 10 enables the components of the fluid power system 10 to operate. For example, the variable speed hydraulic pump 12 pumps the fluid throughout the fluid power system 10 such that the fluid flows through the machine 22 and powers the machine 22 to execute the operations of the machine 22. The fluid then flows out of the machine 22 and into the tank 20 to be recirculated back through the fluid power system 10 again and again as the fluid power system 10 operates. In doing so, the performance of the fluid power system 10 as well as the health of the components of the fluid power system 10, such as the pump 12 and the machine 22, may be dependent upon the fluid. As the quality of the fluid remains increased, then fluid circulates through the fluid power system 10 as the components of the fluid power system 10 operate and the fluid does not have any negative impact on the components of the fluid power system 10. Rather, the performance of the fluid power system 10 remains increased and the components of the fluid power system 10 operate without suffering any unnecessary wear and/or damage due to the increased quality of the fluid.

For example, the fluid when flowing through the fluid power system 10 may collect varnish as the fluid power system 10 operates. Varnish may be collected in the fluid from the pipes of the fluid power system 10 that the fluid flows as well as from the machine 22. As the machine 22 operates, the machine may generate varnish which is then collected in the fluid. As the fluid collects varnish, the density of the fluid increases thereby decreasing the quality of the fluid as the fluid with an increased density of varnish may slowly clog the fluid power system 10 and negatively impact the components of the fluid power system 10, such as the machine 22 and the pump 12. However, the fluid with decreased levels of varnish have an increased quality and thus provides a fluid that more easily flows through the fluid power system 10 and positively impacts the performance of the fluid power system 10.

In another example, the fluid filter 16 may remove the particles from the fluid to protect the pump 12 that may pressurize the fluid for use by a machine 22 in fluid communication with the pump 12 via a main line 24. The pump 12 and the machine 22 may be valuable components of the fluid power system 10 in that the pump 12 and the machine 22 may execute the operations necessary to maintain the fluid power system 10 to complete the designated tasks, such as functioning on a manufacturing line. The fluid is pumped by the pump 12 and circulated through the machine 22 such that the machine 22 may execute the operations with the circulation of the fluid. Particles may be accumulated into the fluid as the fluid flows through the different components of the fluid power system 10. Such particles that accumulate in the fluid may significantly impact the operation of the components, such as the pump 12 and the machine 22, as the fluid flows through those components with the accumulated particles. Eventually, the particles may accumulate in the fluid to a point where the increased accumulation of the particles may trigger wear and/or damage the components of the fluid power system 10 as the particles continue to accumulate.

Further, the fluid of the fluid power system 10 may be an indicator as to an overall status of the fluid power system 10. Since the fluid flows throughout the fluid power system 10 and flows through each of the components of the fluid power system 10, the fluid may be impacted when the performance of different components of the fluid power system 10 may begin to decrease. A fluid status of the fluid may be a status of the fluid that is indicative as to how the fluid is being impacted by the operation of the fluid power system 10. As the fluid flows through the fluid power system 10 during operation of the fluid power system 10, different fluid parameters of the fluid may be impacted thereby impacting the fluid status of the fluid. The fluid parameters may be measurable parameters of the fluid that may fluctuate due to the impact on the fluid by the operation of the fluid power system 10.

For example, as the fluid flows through the fluid power system 10 during the operation of the fluid power system 10, wear metals included in the fluid may increase. An in increase in wear metals in the fluid may decrease the quality of the fluid as the fluid may then circulate the wear metals throughout the fluid power system 10 as well as the components of the fluid power system 10 and thereby decreasing the performance of the fluid power system 10 and causing wear and/or damage to the components of the fluid power system 10. However, an increase in wear metals in the fluid is also an indicator that a portion and/or component of the fluid power system 10 is malfunctioning. An increase of wear metals in the fluid is being triggered by some aspect of the operation of the fluid power system 10 and that aspect is beginning to malfunction due to the increase of wear metals in the fluid.

In such an example, the increase of wear metals in the fluid may be caused by an increase of vibration by a component of the fluid power system 10. The vibration by the component of the fluid power system 10 is a malfunction in the operation of the fluid power system 10. Often times, an increase in the wear metals of the fluid due to an increase in vibration of the component of the fluid power system 10 may occur before the vibration may even be detectable by a user. Thus, an increase in the wear metals in the fluid may be an indicator that an increase in vibration of the component is occurring and the user may then examine the components of the fluid power system 10 with regard to resolving the increase in vibration before any negative impact to the fluid power system 10 is suffered and/or damage to the vibrating component is incurred.

Degradation to the components of the fluid power system 10 may increase when the fluid status of the fluid indicates that a decrease in the quality of the fluid is occurring based on the fluid parameters of the fluid. The degradation to the components may continue to increase if the fluid continues to flow through the fluid power system 10 with the decreased quality and without any corrective action being executed to increase the quality of the fluid. As noted above, the fluid status of the fluid may be an indicator as to the quality of the fluid based on the different fluid parameters of the fluid that may be measured. Continuing to allow the fluid to flow through the fluid power system 10 when the fluid status indicates that the quality of the fluid is decreasing without executing any corrective action to increase the quality of the fluid simply further increases the decrease in the performance of the fluid power system 10 as well as the increase in the wear and/or damage caused to the components.

Rather, determining a corrective action and an assessment of the corrective action that may be executed to improve the fluid status of the fluid such that the quality of the fluid increases may be remedial action that enables the fluid power system 10 to continue to operate with lessened negative impact on the performance of the fluid power system 10 as well as the wear and/or damage caused to the components. The fluid parameters of the fluid as measured may provide indicators as to the type of corrective action that is to be executed in order to improve the fluid status of the fluid and thereby increasing the quality of the fluid. Each fluid parameter may be directed to a root cause of malfunction of the fluid power system 10 and thereby provide a corrective action to remedy the root cause of the fluid power system 10.

For example, the fluid parameter of varnish included in the fluid may continue to increase and thereby trigger the fluid status of the fluid to decrease indicating a decrease in the quality of the fluid. An increase in the fluid parameter of varnish included in the fluid may trigger a corrective action to execute a re-additization of the fluid such that solubility additives may be added into the fluid. The addition of the solubility additives into the fluid may dissolve the varnish included in the fluid as well as the varnish included in the components of the fluid power system 10. In doing so, the fluid status of the fluid may increase due to an increase in the quality of the fluid that is triggered by the execution of the corrective action in adding solubility additives into the varnish to decrease the varnish included in the fluid.

The determination of the fluid status of the fluid in real-time monitoring may enable the fluid parameters of the fluid to be continuously monitored as the fluid flows through the fluid power system 10. In monitoring the fluid parameters of the fluid as the fluid continuously flows through the fluid power system 10 may enable the fluid parameters to be monitored in real-time monitoring as the fluid power system 10 operates and thereby to identify any fluid parameter that may deviate and be an indicator that the fluid status of the fluid is decreasing. In doing so, any indication that the fluid status is decreasing may be executed in real-time monitoring and thereby the appropriate corrective action to be executed to increase the fluid status of the fluid may also be determined in real-time monitoring such that the decrease in the fluid status of the fluid may be adequately addressed. Real-time monitoring may be the measuring of the fluid parameters as the fluid continuously flows through the fluid power system 10 as the fluid power system operates and thus any determination of the fluid status of the fluid may also be executed as the fluid parameters of the fluid fluctuate.

However, conventionally, the fluid status of the fluid is determined by capturing a sample of the fluid from the fluid power system 10. Rather than monitoring the fluid parameters as the fluid flows through the fluid power system 10 in real-time, the sample of the fluid is captured and then conventionally shipped to a lab that then performs the analysis of the fluid parameters of the fluid for that specific sample. The lab may then ship the results of the fluid parameters of the fluid in that sample back to the user. Rather than monitoring the fluid parameters in real-time to determine a real-time fluid status of the fluid, the conventional lab approach may take days for the fluid parameters to be monitored and a fluid status of the fluid to be determined.

Further, the fluid parameters monitored of the sample and the fluid status of the sample is a static snapshot of the fluid after the fluid is removed from the fluid power system 10. The static snapshot is not indicative of the dynamic changes of the fluid parameters as the fluid continuously flows through the fluid power system 10 as the fluid power system 10 operates. Thus, the lab assessment of the sample of fluid fails to monitor the fluid parameters in real-time and/or provide a fluid status of the fluid in real-time as well as trigger corrective actions to be executed in real-time to address the fluid status of the fluid.

For example, the conventional approach of capturing a sample of the fluid power system 10 and then sending to a lab for analysis to monitor the fluid parameters of the fluid as well as determine the fluid status of the fluid takes 3 days for the lab to analyze the sample of fluid and then send the results to the user. The conventional lab determines that the particle absorption saturation level of the fluid filter 16 is reached and that replacement of the fluid filter 16 with a new fluid filter that has the capacity to adequately retain the particles of the fluid as the fluid flows through the new fluid filter to adequately prevent the other components of the fluid power system 10 from suffering a decrease in performance and/or enduring additional wear and/or damage is required.

However, the conventional lab approach took 3 days to determine that the particle count of the fluid has increased to a point that the fluid status of the fluid is decreasing and that a corrective action to replace the fluid filter 16 is required to decrease the particle count in the fluid. During the 3 days, the fluid power system 10 continued to operate with the fluid having an increased particle count and thereby unnecessarily decreased the performance of the fluid power system 10 as well as caused unnecessary wear to the components of the fluid power system 10.

Further, the conventional sampling approach may be extremely difficult to execute as well as extremely expensive to execute for specific applications that require the fluid status of the fluid in the fluid power system 10 to be determined. For example, the sampling of the fluid that flows through a wind turbine gear box may be extremely difficult to execute as well as extremely specific to execute. Wind turbine gear boxes are positioned significantly high off the ground and require a certified individual to climb the wind tower of the wind turbine to reach the wind turbine gear box to sample the fluid flowing through the wind turbine gear box. An extreme amount of time is required to for each certified individual to climb the tower to obtain the fluid sample as well as an extreme amount of cost as the cost of each certified individual to climb the tower to obtain the fluid sample is immense. Thus, the sampling of the fluid of the wind turbine gear box may occur once a year and the monitoring of the fluid parameters and a determination of the fluid status of the fluid of the wind turbine gear box then occurs once a year.

Further, the conventional sampling approach may also include significant inconsistencies in the fluid that is sampled from fluid power system 10. Often times, the fluid power system 10 may be positioned in a factory setting and is exposed to an increase of dirty and/or dusty conditions as well as moisture and/or heat and so. Further, the maintenance individuals tasked with obtaining the sample of the fluid from the fluid power system 10 may also fail to follow the procedure in obtaining the sample of the fluid. In doing so, each time a maintenance individual attempts to obtain the sample of the fluid, the maintenance individual may deviate from the procedure in obtaining the sample of the fluid differently each time. Thus, the sample of the fluid obtained from the fluid power system 10 may be contaminated in a different manner thereby significantly impacting the consistency of each sample of the fluid that is obtained and then analyzed to determine the fluid status of the fluid.

For example, a first maintenance individual may walk to the fluid power system 10 which is positioned in a dusty and/or dirty location of the factory and open the clean sample bottle in the dusty and/or dirty location thereby introducing a measurable and/or significant amount of dust into the sample bottle before even obtaining the sample of the fluid. Once the first maintenance individual fills the sample bottle with the fluid, the dust that collected inside the sample bottle then contaminates the fluid and unnecessarily impacts the fluid parameters of the fluid due to the fluid not including the additional dust when flowing through the fluid power system 10. Further, a second maintenance individual may collect the sample of the fluid from a different position on the fluid power system 10 than the first maintenance individual. The fluid parameters of the fluid sample at the first location of the fluid power system 10 are different than the second location of the fluid power system 10. Thus, the different samples of the fluid taken from different portions of the fluid power system 10 may result in different fluid parameters of the fluid.

In this regard and in one embodiment of the invention, a fluid monitoring device 32 is coupled to the fluid power system 10 to measure a characteristic of the fluid flow. Fluid flow incorporates how a fluid flows throughout the fluid power system 10. For example, a pressure change in which the fluid flows through the fluid filter 16 as determined by the pressure of the fluid as measured and then the difference in the pressure of the fluid as measured. The pressure change in fluid flow may remain consistent for each cycle of the machine 22. The pressure change of the fluid flow at the fluid filter 16 is an indicator of the particle absorption level of the fluid filter 16. However, degradation in the performance of the fluid filter 16 may cause the pressure change of the fluid flow at the fluid filter 16 to increase to a threshold level that is indicative that the fluid filter 16 has reached the particle absorption saturation level.

The characteristic of fluid flow may be an identifiable parameter of the fluid flow that may be measured by the fluid monitoring device 32 and/or derived from other characteristics and/or combination of characteristics measured by the fluid monitoring device 32. The fluid monitoring device 32 may monitor one or more characteristics of the fluid as the fluid passes through the fluid power system 10. Characteristics of the fluid flow whether measured by the fluid monitoring device 32 and/or derived from other characteristics measured by the fluid monitoring device 32 may be indicative as to the performance of the fluid of the fluid power system 10. As the performance of the fluid degrades, the characteristics may provide an indication that the performance of the fluid is degrading and/or to the rate in which the performance of the fluid is degrading.

For example, the temperature of the fluid and the percentage of water saturation of the fluid as the fluid flows throughout the fluid power system 10 may be indicative as to the performance of the heat exchanger of the fluid power system 10. The temperature of the fluid and the saturation of the fluid may be fluid parameters of the fluid that may not only be indicative as to the fluid status of the fluid but may also be indicative as to components of the fluid power system 10 that may be malfunctioning and triggering the fluid status of the fluid to decrease thereby causing the quality of the fluid to decrease. In such an example, the temperature of the fluid may decrease as the fluid flows through the fluid power system 10 while the saturation of the fluid may increase as the fluid flows through the fluid power system 10. Such a decrease in temperature coupled with an increase in saturation of the fluid may be indicative that a corrective action directed to evaluating the heat exchanger of the fluid power system 10 is to be executed in order to prevent an impact on the performance of the fluid power system 10 as well as wear and/or damage to additional components of the fluid power system 10.

The characteristics of fluid flow that may be monitored by the fluid monitoring device 32 and/or derived from characteristics monitored by the fluid monitoring device 32 may include but are not limited to the pressure change, flow rate, volume, temperature, pump efficiency, viscosity, thermal properties, Reynolds number, particle count, relative humidity, viscosity, density, dielectric properties, AC conductivity, permittivity, pressure, wear metals level, varnish level, saturation level, and/or any other type of characteristic that may be an identifiable fluid parameter of the fluid that will be apparent to those skilled in the relevant art(s) without departing from the spirit and scope of the disclosure.

The fluid monitoring device 32 may monitor the characteristic of the fluid flow at a first point and a second point on a flow path of the fluid monitoring device 32. The flow path is a path that the fluid flows through the fluid monitoring device 32. For example, the flow path includes the path of the fluid from a first point in the tank 20 through the fluid monitoring device 32 to a second point in the tank 20. As the fluid flows through the fluid monitoring device 32, differences between the characteristic as monitored by the fluid monitoring device 32 at the first point and then the second point may be indicative as the fluid status of the fluid in real-time.

The fluid is circulated throughout the fluid power system 10 when driving the machine 22. The fluid monitoring device 32 may monitor numerous fluid parameters that are detected from the characteristics of the fluid as the fluid is circulated throughout the fluid power system 10. The fluid monitoring device may monitor the numerous fluid parameters based on different sensors included in the fluid monitoring device 32 as well as sensors positioned throughout the fluid power system 10 and the components of the fluid power system 32.

In doing so, the characteristics of the fluid may be assessed in real-time as the fluid is circulated throughout the fluid power system 10 and the different fluid parameters are triggered from the characteristics of the fluid changing in real-time. Different components of the fluid power system 10 may then be identified by the assessment of the different fluid parameters triggered by the characteristics of the fluid that are impacted by the different fluid parameters. As noted above, the fluid parameters that impact the fluid status of the fluid not only impact the quality of the fluid but may also result from the operation of different components of the fluid power system 10 that have begun to malfunction. Thus, the identification of fluid parameters that deviate in the fluid and decrease the fluid status of the fluid may trigger remedial actions to be taken to address the different components of the fluid power system 10 that may have triggered the deviation in the fluid parameters due to a malfunction.

For example, the fluid monitoring device 32 may monitor the level of water saturation of the fluid in real-time. As the level of water saturation of the fluid decreases and negatively impacts the fluid status of the fluid, an assessment of the fluid may result in a dehydration of the fluid is occurring and that the pump 12 is to be assessed as to whether the pump 12 is failing to adequately circulate the fluid throughout the fluid power system. In doing so, corrective action to assess the pump 12 may be executed to remedially address the decrease in the level of water saturation of the fluid.

The fluid monitoring device 32 may monitor any type of fluid whether the fluid be liquid and/or gas that may flow through the fluid monitoring device 32 such that the different fluid parameters may be determined. The fluid may include but is not limited to oil, lubricants, air, blood and/or any other type of fluid that may be liquid and/or gas that may flow through the fluid monitoring device 32 that will be apparent to those skilled in the relevant art(s) without departing from the spirit and scope of the disclosure.

Further the fluid power system 10 is an example system that may incorporate the flow of fluid to operate as well as including a fluid filter 16 to retain particles from the fluid as the fluid flows through the fluid filter 16. However, the fluid monitoring device 32 may be incorporated into any type of fluid system that may incorporate the flow of fluid to operate as well as the fluid filter 16 to retain particles from the fluid as the fluid flows through the fluid filter 16. For example, the fluid monitoring device 32 may be incorporated into industrial lubrication systems, hydraulics systems, air filtration systems, process filter systems, blood filter systems and/or any other type of system that may incorporate fluid flow to operate as well as the fluid filter 16 that will be apparent to those skilled in the relevant art(s) without departing from the spirit and scope of the disclosure.

Figure 2:
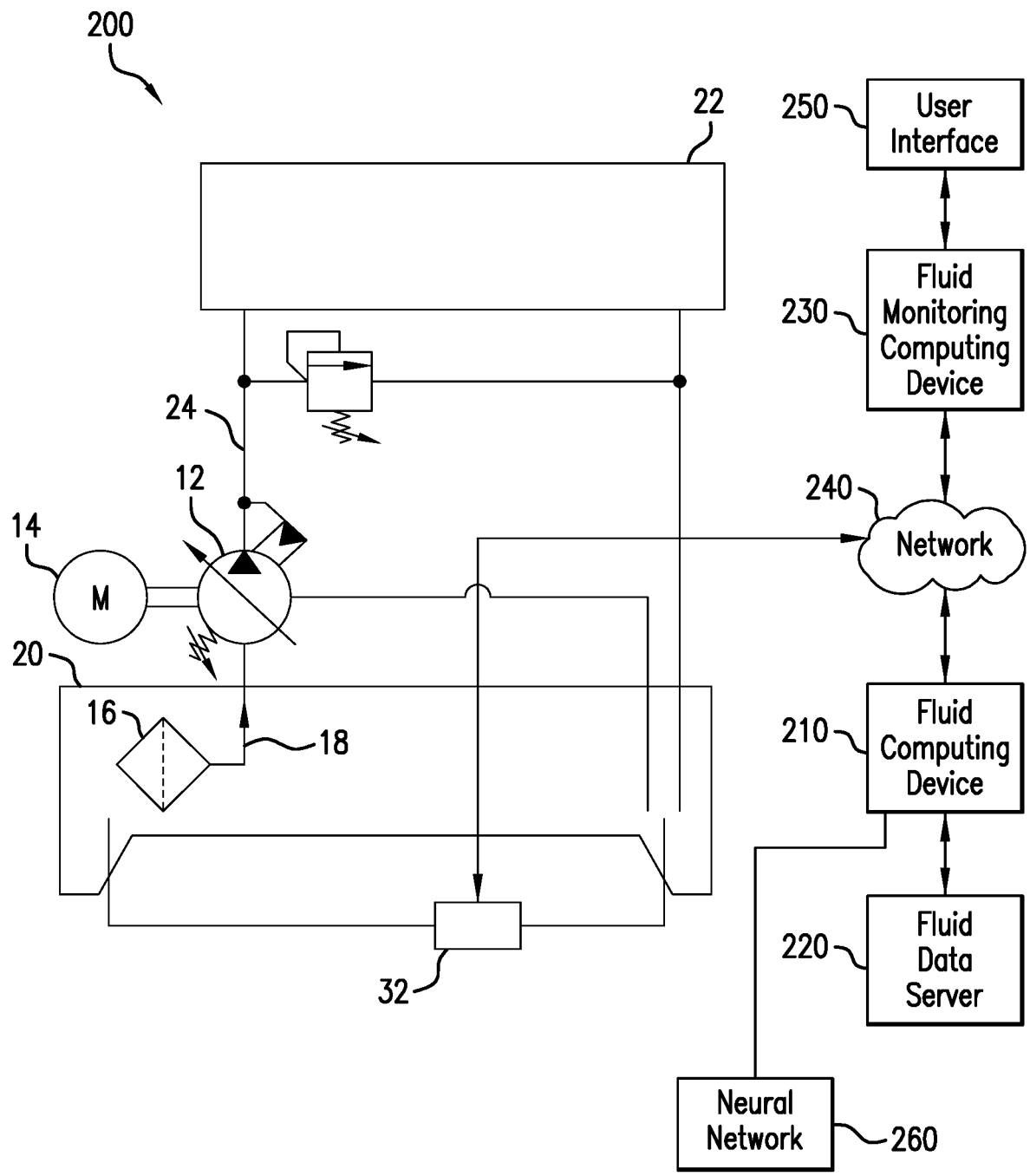
FIG. 2 is schematic view of the fluid computing configuration according to one embodiment of the invention.

FIG. 2 illustrates a fluid computing configuration 200 in which embodiments of the present invention, or portions thereof, may be implemented. The fluid computing configuration 200 includes the fluid power system 10 as discussed in detail in FIG. 1, a fluid computing device 210, a fluid data server 220, a fluid monitoring computing device 230, a neural network 260 and a network 240. The fluid monitoring computing device 230 includes a user interface 250.

In one embodiment of the present invention, the fluid computing device 210 may communicate with the fluid monitoring device 32 to obtain fluid data generated from the monitoring of the characteristics of fluid flowing through the fluid monitoring device 32. The fluid computing device 210 may then analyze the fluid data to generate different types of analytics of the fluid, such as whether a characteristic has exceeded a threshold, that provide insight that is easily understandable by a user as to the performance of the fluid. The fluid computing device 210 may then communicate the analytics of the fluid to a fluid monitoring computing device 230 that is operated by the user so that the user may monitor the performance of the fluid via the analytics provided to the user via the fluid monitoring computing device 230.

The fluid monitoring device 32 includes a microprocessor, a memory and a network interface and may be referred to as a computing device or simply "computer". In one embodiment of the present invention, multiple modules may be implemented on the same computing device. Such a computing device may include software, firmware, hardware, or a combination thereof. Hardware can include but is not limited to, a microprocessor and/or a memory.

As the fluid monitoring device 32 monitors the fluid data for each characteristic of the fluid flow of the fluid power system 10, the fluid monitoring device 32 may store the fluid data in the fluid data server 220 via the network 240. In an embodiment, each sensor that provides a signal to the fluid monitoring device 32 may have an Internet Protocol (IP) address associated with each particular sensor. The fluid monitoring device 32 may then stream the fluid data that is measured by each sensor for each characteristic that is monitored by the fluid monitoring device 32 via network 240 and then stores the fluid data in the data server 220 based on the IP address of the fluid data.

The fluid computing configuration 200 may include one or more fluid power systems 10 that include one or more fluid filters 16 and one more sensors in which each is associated with the fluid monitoring device 32 that is monitoring the fluid flow of the fluid. Thus, the fluid computing configuration 200 may also include one or more fluid monitoring devices 32 dependent on the quantity of fluid power systems 10 included in the filter computing configuration 200. Each fluid monitoring device 32 may then stream fluid data for each characteristic specific to the fluid flow of the fluid that each fluid monitoring device 32 is monitoring via network 240 to and store the fluid data in the fluid data server 220.

For example, the fluid computing configuration 200 may include a large factory that includes hundreds of sensors. Each of the sensors that are active in the factory are associated with a fluid monitoring device 32. The fluid monitoring device 32 streams fluid data for the characteristics specific to each individual sensor and stores the fluid data specific to each sensor included in the factory in the fluid data server 220.

The fluid computing device 210 includes a processor, a memory, and a network interface, herein after referred to as a computing device or simply "computer". For example, the fluid computing device 210 may include a data information system, data management system, web server, and/or file transfer server. The fluid computing device 210 may also be a workstation, mobile device, computer, cluster of computers, set-top box or other computing device. In an embodiment, multiple modules may be implemented on the same computing device. Such a computing device may include software, firmware, hardware, or a combination thereof. Software may include one or more applications on an operating system. Hardware can include, but is not limited to, a processor, memory, and/or graphical user interface display. The fluid computing device 210 may be coupled to the fluid monitoring device 32 and/or coupled to the fluid power system 10. The fluid computing device 210 may also be positioned remote from the fluid monitoring device 32 and/or the fluid power system 10.

As the fluid computing device 210 generates the analytics of the fluid flow based on the fluid data, the fluid computing device 210 may query the fluid data server 220 for the fluid data associated with the characteristics that the fluid computing device 210 is to generate based on the IP address associated with the fluid data. For example, the fluid computing device 210 may retrieve the fluid data associated with the first pressure transducer and the second pressure transducer to generate the analytics of the pressure change between the first pressure transducer and the second pressure transducer based on the IP addresses associated with the fluid data measured by the first pressure transducer and the second pressure transducer. The fluid computing device 210 may generate the analytics of the fluid flow for each of the fluid filters 16 included in the fluid computing configuration 200.

The fluid monitoring computing device 230 includes a processor, a memory, and a network interface, herein after referred to as a computing device or simply "computer." For example, the fluid monitoring computing device 230 may be a workstation, mobile device, computer, cluster of computers, or other computing device. In an embodiment, multiple modules may be implemented on the same computing device. Such a computing device may include software, firmware, hardware, or a combination thereof. Software may include one or more applications on an operating system. Hardware can include, but is not limited to, a processor, memory, and/or graphical user interface display.

The user interface 250 may provide a user the ability to interact with the fluid monitoring computing device 230. The user interface 250 may be any type of display device including but not limited to a touch screen display, a liquid crystal display (LCD) screen, and/or any other type of display that will be apparent from those skilled in the relevant art(s) without departing from the spirit and scope of the present disclosure.

The fluid monitoring computing device 230 may be a computing device that is accessible to the user that is monitoring the performance of the fluid. The fluid computing device 210 may stream the analytics to the fluid monitoring computing device 230 via network 240 and the fluid monitoring computing device 230 may display the analytics via the user interface 250. The fluid computing device 210 may be a stationary computing device and positioned in an office in which the user may monitor the analytics provided by the fluid computing device 210 for the fluid. The fluid computing device 210 may also be a mobile device in which the user may be able to monitor the analytics for the fluid as the user changes locations.

The fluid monitoring computing device 230 may display the analytics via the user interface 250 streamed by the fluid computing device 210 for the fluid in which the fluid computing device 210 has generated analytics. For example, the fluid computing configuration 200 includes a factory with hundreds of fluid power systems 10. The fluid monitoring computing device 230 may display the analytics for each of the several fluid power systems 10 included in the filter computing configuration 200 such that the user may monitor the performance of each fluid simultaneously. The fluid monitoring computing device 230 may also provide further analytics specific to a single fluid power system 10 included in the fluid computing configuration 230 when the user requests to focus in on the analytics for a single fluid power system that is of interest to the user.

Wireless communication may occur via one or more networks 240 such as the internet. In some embodiments of the present invention, the network 240 may include one or more wide area networks (WAN) or local area networks (LAN). The network may utilize one or more network technologies such as Ethernet, FastEthernet, Gigabit Ethernet, virtual private network (VPN), remote VPN access, a variant of IEEE 802.11 standard such as Wi-Fi, and the like. Communication over the network 240 takes place using one or more network communication protocols including reliable streaming protocols such as transmission control protocol (TCP). These examples are illustrative and not intended to limit the present invention. Wired connection communication may occur with but is not limited to a fiber optic connection, a coaxial cable connection, a copper cable connection, and/or any other direct wired connection that will be apparent from those skilled in the relevant art(s) without departing from the spirit and scope of the present disclosure.

As noted above, the fluid monitoring device 32 may monitor different characteristics of the fluid flow for the fluid power system 10. The fluid monitoring device 32 may then provide fluid data generated from the monitoring of the characteristics of the fluid flow by the fluid monitoring device 32 to the fluid computing device 210. The fluid data is a significant amount of data generated from the monitoring of the characteristics of the fluid flow over time that is incorporated by the fluid computing device 210 to determine different types of analytics for the fluid. For example, the fluid data includes the viscosity of the fluid. As the viscosity of the fluid increases, the fluid status of the fluid may decrease and a corrective action may be determined to provide additives to the fluid to decrease the viscosity of the fluid thereby increasing the fluid status of the fluid.

Analytics of the fluid filter 16 that may be generated by the fluid computing device 210 incorporate the fluid data for each characteristic as monitored by the fluid monitoring device 32 and from the fluid data to provide insight to the performance of the fluid that is easily understood by the user. The amount of fluid data monitored by the fluid monitoring device 32 and provided to the fluid computing device 210 may be immense. For example, the fluid power system 10 may operate for significant portions of each day and may only be taken offline for short periods of time in a given year. Thus, the amount of fluid flowing through the fluid power system 10 may be significant as the pump 12 operates continuously for significant periods of time resulting in an immense amount of fluid data for each characteristic that is monitored by the fluid monitoring device 32.

Such an immense amount of fluid data monitored by the fluid monitoring device 32 and stored in the fluid data server 220 may be extremely difficult for the user to parse through to obtain an assessment of the performance of the fluid. However, the fluid computing device 210 may analyze the immense amount of fluid data and provide meaningful analytics that provide insight as to the performance of the fluid that are easily understood by the user.

For example, the fluid computing device 210 may generate an analytic that presents the characteristic of the water saturation in the fluid. As the water saturation increases, the fluid status of the fluid may decrease as the quality of the fluid is decreasing. However, the increase in the water saturation may be in assessed in real-time and may be indicative water is leaking into the fluid of the fluid power system 10. In doing so, the corrective action of searching the fluid power system 10 for the source of where the water is leaking into the fluid may provide the remedial assessment that the issue triggering the increase of the water saturation level of the fluid is occurring due to water leaking into the fluid. Thus, the user may easily identify the corrective action to increase the fluid status of the fluid based on the increase in the water saturation level of the fluid.

The fluid computing device 210 may incorporate the fluid data as monitored by the fluid monitoring device 32 for a particular characteristic of the fluid flow with regard to the fluid into an analytic such as a visual graph that depicts how the characteristic of the fluid deviates over an extended period of time. Rather than the user having to parse through an immense amount of fluid data to assess the performance of the fluid, the fluid computing device 210 incorporates the fluid data into an easily understood visual graph that provides insight to the user with regards to the performance of the fluid.

Figure 3:
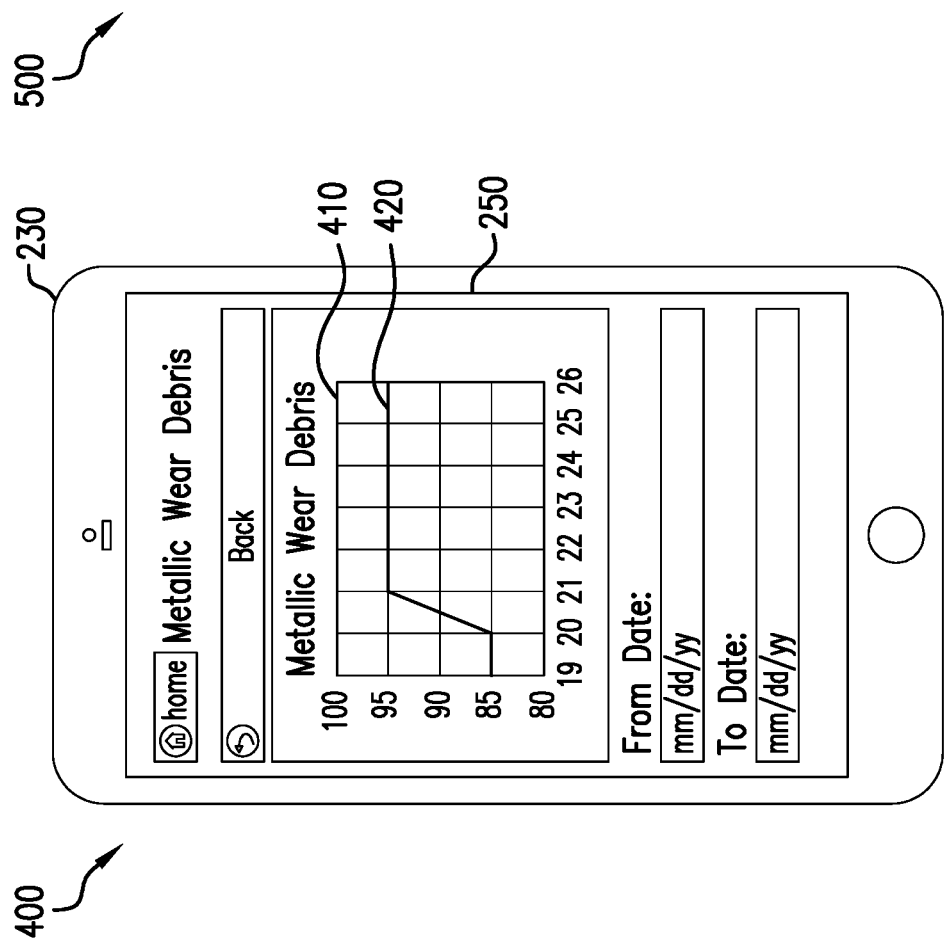
FIG. 3 is a schematic view of an example visual graph configuration in which the fluid monitoring computing device displays a visual graph of the metallic wear debris parameters via the user interface of the fluid monitoring computing device according to one embodiment of the invention.

For example, FIG. 3 depicts an example visual graph configuration 400 in which the fluid monitoring computing device 230 displays a visual graph of the metallic wear debris parameters of the fluid via the user interface 250 of the fluid monitoring computing device 210. The metallic wear debris parameters are indicative as to a metallic debris status of the fluid power system 10 operates. The fluid monitoring device 32 may continuously monitor the metallic wear debris parameters in real-time as the fluid power system 10 operates. As the fluid power system 10 operates each of the components of the fluid power system 10 may have wear that impacts each of the components. As the wear of the components of the fluid power system 10 continue, metallic wear debris may be generated by the grinding and/or vibrating of the components as the components operate and the metallic wear debris may then move into the fluid as the fluid flows through the fluid power system 10. As the grinding and/or vibrating of the components increase, the levels of the metallic wear debris parameters of the fluid also increase.

The example visual graph configuration 400 depicted in FIG. 3 depicts how the metallic wear fluid parameters for the fluid have deviated over a period of time. As can be seen in FIG. 3, user interface 250 of the fluid monitoring computing device 230 depicts a visual graph 410 of the metallic wear debris parameters as the fluid flows through the fluid power system 10 over time. The metallic wear debris parameters at a lower value on the plot 420 during the initial stages of the fluid flowing through the fluid power system 10 as the fluid is initially introduced into the fluid power system 10 and then continues to increase during the life of the fluid as the fluid continues to retain metallic wear debris from the components of the fluid power system 10 as the fluid flows through the fluid power system 10. As the fluid continues to retain metallic wear debris, the metallic wear debris parameters of the fluid continues to increase due to the continued grind and/or vibration of the components of the fluid power system 10. Thus, the increase in the metallic wear debris parameters of the fluid is indicative to an increase in grind and/or vibration of one or more components included in the fluid power system 10.

The visual graphs of characteristics and/or analytics of fluid flow that may be generated by the fluid computing device 210 may include but are not limited to pressure change, flow rate, volume, temperature, pump efficiency, viscosity, thermal properties, Reynolds number, particle count, relative humidity, viscosity, density, dielectric properties, AC conductivity, permittivity, pressure, wear metals level, varnish level, saturation level, and/or any other type of characteristic that may be an identifiable fluid parameter of the fluid that will be apparent to those skilled in the relevant art(s) without departing from the spirit and scope of the disclosure.

The fluid computing device 210 may generate an alert and provide that alert to the user via the fluid monitoring computing device 230 when the specific characteristic exceeds or deviates below the designated threshold of the specific characteristic. Rather than requiring the user to monitor the visual graph for each characteristic and/or analyze other more complicated analytics generated by the fluid computing device 210, the fluid computing device 210 may generate an alert so the user is notified when any of the characteristics have exceeded and/or have deviated below the specified threshold for each characteristic. The user may then drill down further and request more detailed analytics but yet still be easily understandable, such as the visual graph of the failing characteristic, to gain further analysis of what has occurred with regards to the failing characteristic.

For example, the metallic wear debris parameters of the fluid when initially being commissioned for the first time may have a metallic wear debris parameter of 85 that indicates the amount of metallic debris that is included in the fluid as the fluid flows through the fluid power system 10. As the components of the fluid power system 10 continue to operate and the fluid flows through the fluid power system 10, the metallic wear debris parameter may start out at 85 but may then continue to increase as components of the fluid power system 10 grind and/or vibrate thereby generating an increase of the metallic wear debris included in the fluid. Corresponding metallic wear debris parameter thresholds for the metallic wear debris parameters when reached provides a significant indication that one or more components are grinding and/or vibrating and thereby generating an increase in the metallic wear debris included in the fluid. The fluid computing device 210 then generates an alert to the user when at least one of the metallic wear debris parameters reaches the corresponding metallic wear debris parameter threshold of 95.

In addition to simply generating the alert that at least one of the metallic wear debris parameters have increased above the corresponding metallic wear debris parameter threshold, fluid computing device 210 may also generate an indicator in real-time that indicates the at least one component and the plurality of component characteristics that are to be targeted by the corrective action to increase the quality of the fluid. For example, the increase in the metallic wear debris included in the fluid may be generated by a failure of a component included in the fluid power system 10. Such a failure of the component may be generating an increase in grinding and/or vibrating of the component and thereby generating an increase in the metallic wear debris that is included in the fluid. Rather than simply generate the alert that metallic wear debris parameters have increased above the corresponding metallic wear debris parameter thresholds, fluid computing device 210 may also indicate the valve and/or pump 12 and/or sensor that is failing and is generating the increase in the metallic wear debris in the fluid. In doing so, corrective action may be taken to repair the failing component to increase the fluid status of the fluid.

The fluid computing device 210 may also provide the status of the characteristic of the density of the fluid. The fluid computing device 210 may stream to the fluid monitoring computing device 230 the status of the density of the fluid with regards to whether the density of the fluid exceeded the corresponding metallic wear debris parameter threshold for density. As the density of the fluid increases and continues to be at an increased level for a period of time, such an increase may be indicative that the increased level of the density may indicate that particles included in the fluid may remain suspended thereby causing wear on the components of the fluid power system 10. Further a change in the density of the fluid may be related to the cleanliness of the fluid and may cause additional machine wear as well as an impact on the performance of the fluid power system 10.

The fluid computing device 210 may simplify the analytics with regards to the fluid even further from the visual graph while still providing the user with insight as to the performance of the fluid that is easily understood. As mentioned above, the user may be responsible for monitoring numerous fluid included in the fluid computing configuration 200, such as a factory that includes numerous fluid power systems 10. The user may also be responsible for many other facets of the factory in addition to the fluid and/or numerous other fluids and may not be able to routinely analyze easily understood analytics such as the visual graph and/or other easily understood analytics generated by the fluid computing device 210.

Thus, the fluid computing device 210 may simply provide the status of the fluid with regards to different characteristics of the fluid flow based on a threshold for each of the different characteristics. The fluid computing device 210 may monitor each of the different characteristics to determine whether any of the different characteristics exceeds or deviates below a threshold for the fluid. The threshold for each of the different characteristics may be customized for each specific characteristic. Each threshold may be based on a level in which the specific characteristic exceeds or deviates below and thus provides a significant indication that the performance of the fluid is degrading and requires the attention of the user.

Figure 4:
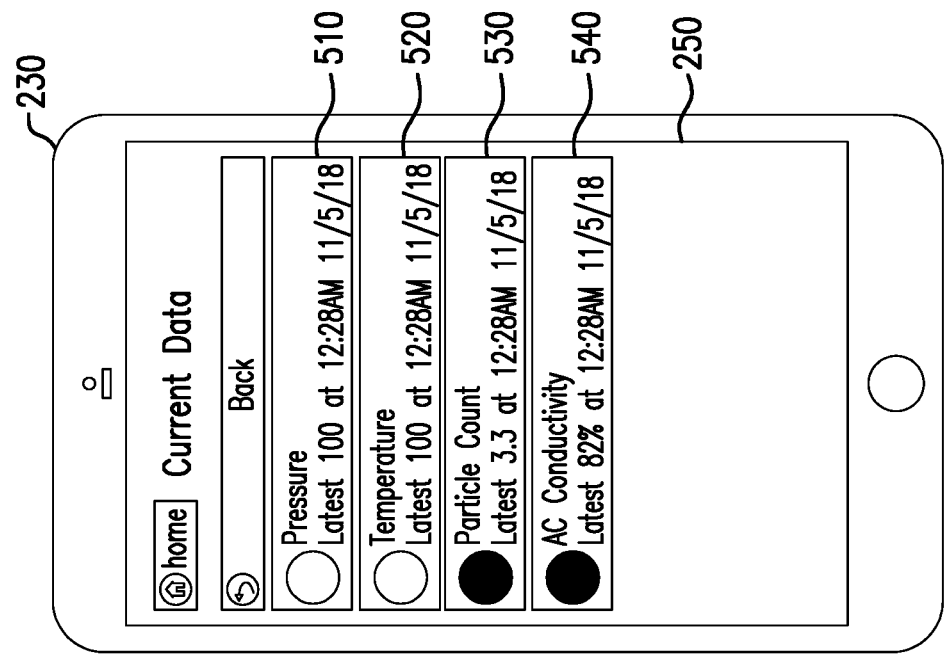
FIG. 4 is a schematic view of an example threshold alert configuration in which the fluid monitoring computing device displays a status of several characteristics of the fluid with regards to whether the characteristics have exceeded or deviated below their respective thresholds via the user interface according to one embodiment of the invention.

For example, FIG. 4 depicts an example threshold alert configuration 500 in which the fluid monitoring computing device 230 displays a status of several characteristics of the fluid flow with regards to whether the characteristics have exceeded or deviated below their respective thresholds via the user interface 250. The fluid computing device 210 may stream the status of each of the characteristics of the fluid via the network 240. The status of each of the characteristics may then be displayed by the fluid computing device 210 via the user interface 250.

The fluid monitoring computing device 230 may depict each of the statuses by an easily recognizable identifier. With regards to the example threshold alert configuration 500 in FIG. 4, the fluid monitoring computing device 230 displays each of the statuses via the user interface 250 via two different colors. The fluid monitoring computing device 230 depicts the status of characteristic that has not exceeded or deviated below its respective threshold with the status identifier of "green" in which the color "green" is a status that is universally recognized there is no concern. The fluid monitoring computing device 230 depicts the status of the characteristic that has exceeded or deviated below its respective threshold and generates an alert with the status identifier of "red" in which the color "red" is a status that is universally recognized as there is cause for concern.

The fluid monitoring device 32 may monitor in real-time as the fluid power system 10 operates a plurality of fluid power system parameters of the fluid at the first point and the second point on the flow path of the fluid monitoring device 32. The fluid power system parameters are indicative as to an operation status of the fluid power system 10 as the fluid power system 10 operates. The fluid power system parameters may provide a more detailed view of the operating status of the fluid power system 10 in that the operating status of the fluid power system 10 may be an indicator as to the overall operating conditions that the fluid power system 10 is experiencing. Examples of fluid power system parameters include but are not limited to temperatures, pressures, flows, moistures, and/or any other fluid power system parameter that may be monitored at tank 20 of the fluid power system 10 but also and numerous different points throughout the fluid power system 10 that will be apparent to those skilled in the relevant art(s) without departing from the spirit and scope of the disclosure.

The fluid computing device 210 may then determine when at least one fluid power system parameter deviates from each corresponding fluid power system parameter threshold. The deviation of the at least one power system parameter from each corresponding fluid power system threshold is indicative that the operation status of the fluid power system 10 is requiring corrective action to increase the quality of the fluid. The fluid computing device 210 may then generate an alert when the at least one fluid power system parameter deviates from the corresponding fluid power system parameter threshold that is indicative that the operation status of the fluid power system 10 is requiring corrective action to increase the quality of the fluid.

For example, the example threshold alert configuration 500 in FIG. 4, provides the status of the characteristic of the pressure of the fluid. The fluid computing device 210 may stream to the fluid monitoring computing device 230 the status of the pressure of the fluid with regards to whether the pressure of the fluid has exceeded the corresponding fluid power system threshold for pressure and the fluid monitoring computing device 230 may display that status via the status pressure indicator 510. As the pressure of the fluid increases and continues to be at an increased level over a period of time, such an increase may be indicative that there may be an issue with the fluid power system 10.

Thus, the fluid computing device 210 determines whether the pressure of the fluid has reached the corresponding fluid power system threshold, and if so, streams to the fluid monitoring computing device 230 an alert that the pressure change has exceeded the corresponding fluid power system threshold for pressure. The fluid monitoring computing device 230 then displays the pressure status indicator 540 as "green" when the pressure remains below the corresponding fluid power system threshold for pressure and then displays the pressure status indicator 540 as "red" as an alert when the pressure reaches the corresponding fluid power system threshold for pressure. The fluid computing device 210 may also stream fluid data associated with the fluid to the fluid monitoring computing device 230 that the fluid monitoring computing device 230 may display. For example, the example threshold alert configuration 500 in FIG. 4, displays that the latest pressure measurement is 100 and was measured at 12:28 AM on Nov. 5, 2018.

For example, the example threshold alert configuration 500 in FIG. 4, also provides the status of the characteristic of the temperature of the fluid. The fluid computing device 210 may stream to the fluid monitoring computing device 230 the status of the temperature of the fluid with regards to whether the temperature of the fluid has exceeded the corresponding fluid power system threshold for temperature and the fluid monitoring computing device 230 may display that status via the status pressure indicator 520. As the temperature of the fluid increases and continues to be at an increased level over a period of time, such an increase may be indicative that there may be an issue with an increase in wear of the components of the fluid power system 10 and/or failure of the components of the fluid power system 10.

Thus, the fluid computing device 210 determines whether the temperature of the fluid has reached the corresponding fluid power system threshold for temperature, and if so, streams to the fluid monitoring computing device 230 an alert that the temperature has exceeded the corresponding fluid power system threshold for temperature. The fluid monitoring computing device 230 then displays the temperature status indicator 520 as "green" when the temperature remains below the corresponding fluid power system threshold for temperature and then displays the temperature status indicator 520 as "red" as an alert when the temperature reaches the corresponding fluid power system threshold for temperature. The fluid computing device 210 may also stream fluid data associated with the fluid to the fluid monitoring computing device 230 that the fluid monitoring computing device 230 may display. For example, the example threshold alert configuration 500 in FIG. 4, displays that the latest temperature measurement is 100 and was measured at 12:28 AM on Nov. 5, 2018.

In addition to generating the alert that the temperature of the fluid power system 10 has exceeded the corresponding fluid power system threshold for temperature, the fluid computing device 210 may also assess in real-time the increase in temperature and determine at least one component that may be triggering the increase in temperature due to malfunctioning of the component. The fluid computing device 210 may then generate an indicator in real-time that indicates the at least one component and the component characteristics of the at least one component that could be triggering the increase in temperature. For example, the fluid computing device 210 may identify that the cooling tower of the fluid power system 10 is failing and such a failure in the cooling tower is triggering the increase in the temperature of the fluid. The fluid computing device 210 may then generate an indicator in real-time to the fluid monitoring computing device 230 that indicates that correction action should be executed to address the cooling tower.

The fluid computing device 210 may also provide the status of the characteristic of relative humidity of the fluid. The fluid monitoring computing device 230 may stream to the fluid computing device 210 the status of the relative humidity of the fluid with regards to whether the relative humidity of the fluid has exceeded the corresponding fluid power system threshold for relative humidity. As the relative humidity of the fluid increases and continues to be at an increased level for a period of time, such an increase may be indicative that the increased level of relative humidity of the fluid may degrade metal components of the fluid power system 10 and activate oxidation of the metal components.

The fluid computing device 210 may also provide the status of the characteristics of Total Acid Number (TAN) of the fluid which determines how the particles in the fluid absorb and disperse energy. The fluid monitoring computing device 230 may stream to the fluid computing device 210 the status of the TAN of the fluid with regards to whether the acid of the fluid has exceeded the corresponding fluid power system threshold for acid. As the TAN of the fluid increases and continues to be at an increased level for a period of time, such an increase may be indicative that the increased level of TAN of the fluid may be resulting from an increase of water saturation level in the fluid.

The fluid computing device 210 may also provide the status of the oxidation level of the fluid via Fourier Transform Infrared (FTIR) spectroscopy which determines the oxidation level of the fluid with regards to whether the oxidation level of the fluid has exceeded the corresponding fluid power system threshold for oxidation. As the level of water saturation and/or water vapor of the fluid increases and continues to be at an increased level, the oxidation level as detected by the FTIR spectroscopy also increases and continues to be at an increased level for a period of time. Such an increase in oxidation may be indicative that the increased level of oxidation of the fluid may be resulting from an increase in the level of water saturation and/or water vapor of the fluid.

The fluid monitoring device 320 may monitor in real-time as the fluid power system 10 operates a plurality of fluid chemistry parameters of the fluid at the first point and the second point on the flow path of the fluid monitoring device 32. The fluid chemistry parameters are indicative as to an electro-chemistry status of the fluid as the fluid power system 10 operates. The fluid chemistry parameters may provide a spread of spectrum inductance sensing that detects a wide range of fluid chemistry parameters that impact the electro-chemistry of the fluid. Examples of fluid chemistry parameters included but are not limited to conductivity, permittivity, moisture, viscosity, soot, dielectric properties, and/or any other fluid chemistry parameter that may be monitored via a spread of spectrum inductance sensing that will be apparent to those skilled in the relevant art(s) without departing from the spirit and scope of the disclosure.

The fluid computing device 210 may then determine when at least one fluid chemistry parameter deviates from each corresponding fluid chemistry parameter threshold. The deviation of the at least one fluid chemistry parameter from each corresponding fluid chemistry parameter threshold is indicative that a quality of the fluid is decreasing and is requiring corrective action to increase the quality of the fluid. The fluid computing device 210 may then generate an alert when the at least one fluid chemistry parameter deviates from the corresponding fluid chemistry parameter threshold that is indicative that the quality of the fluid is decreasing and is requiring corrective action to increase the quality of the fluid.

For example, the example threshold alert configuration 500 in FIG. 4, provides the status of the characteristic of the AC conductivity of the fluid. The fluid computing device 210 may stream to the fluid monitoring computing device 230 the status of the AC conductivity with regards to whether AC conductivity of the fluid has exceeded the corresponding fluid chemistry parameter threshold for AC conductivity and the fluid monitoring computing device 210 may display that status via the status AC conductivity indicator 540. As the AC conductivity of the fluid increases and continues to be at an increased level over a period of time, such an increase may be indicative that there may be an issue with the fluid aging and/or the fluid includes high levels of contamination.

Thus, the fluid computing device 210 determines whether the AC conductivity of the fluid has reached the corresponding fluid chemistry parameter threshold for AC conductivity, and if so, streams to the fluid monitoring computing device 230 an alert that the AC conductivity has exceeded the corresponding fluid chemistry parameter threshold for AC conductivity. The fluid monitoring computing device 230 then displays the AC conductivity status indicator 540 as "green" when the AC conductivity remains below the corresponding fluid chemistry parameter threshold for AC conductivity and then displays the AC conductivity status indicator 540 as "red" as an alert when the AC conductivity reaches the corresponding fluid chemistry parameter threshold for AC conductivity. The fluid computing device 210 may also stream fluid data associated with the fluid to the fluid monitoring computing device 230 that the fluid monitoring computing device 230 may display. For example, the example threshold alert configuration 500 in FIG. 4, displays that the latest AC conductivity measurement is 82% and was measured at 12:28 AM on Nov. 5, 2018.

The fluid chemistry parameters may be monitored and detected based on an infrared (IR) beam that may be emitted into the fluid as the fluid flows through the fluid power system 10. The IR beam may then be adjusted into different channels that correspond to different spectral ranges. Based on each spectral range, each of the different fluid chemistry parameters may be monitored and detected. For example, each of the different spectral ranges may correspond to the AC conductivity of the fluid, the viscosity of the fluid, the dielectric properties of the fluid, the permittivity of the fluid and/or any other type of fluid chemistry parameter that may be monitored and detected based on a corresponding spectral range.

The fluid computing device 210 may also provide the status of the characteristic of viscosity of the fluid. The fluid computing device 210 may stream to the fluid monitoring computing device 230 the status of the viscosity of the fluid with regards to whether the viscosity of the fluid has exceeded the corresponding fluid chemistry parameter threshold for viscosity. As the viscosity of the fluid increases and continues to be at an increased level for a period of time, such an increase may be indicative that the increased level of viscosity of the fluid may include high levels of contamination and/or degradation of the fluid itself. The fluid computing device 210 may also stream to the fluid monitoring computing device 230 the status of the viscosity of the fluid with regards to whether the viscosity of the fluid has decreased below the corresponding fluid chemistry parameter threshold for viscosity. As the viscosity of the fluid decreases and continues to be at a decreased level for a period of time, such a decrease may be indicative that the decreased level of viscosity of the fluid may include low levels of fluid lubricity.

The fluid computing device 210 may also provide the status of the characteristic of dielectric properties of the fluid. The fluid computing device 210 may stream to the fluid monitoring computing device 230 the status of the dielectric properties of the fluid with regards to whether the dielectric properties of the fluid exceeded the corresponding fluid chemistry parameter threshold for dielectric properties. As the dielectric properties of the fluid increases and continues to be at an increased level for a period of time, such an increase may be indicative that the increased level of the dielectric properties may include high levels of wear particles and/or contaminants.

The fluid computing device 210 may also provide the status of the characteristic of permittivity of the fluid. The fluid computing device 210 may stream to the fluid monitoring computing device 230 the status of the permittivity of the fluid with regards to whether the permittivity of the fluid exceeded the corresponding fluid chemistry parameter threshold for permittivity. As the permittivity of the fluid increases and/or decreases and continues to be at an increased level and/or decreased level for a period of time, such an increase and/or decrease may be indicative that the increased and/or decreased level of the permittivity may indicate fluid additive degradation and contamination.

The fluid monitoring device 32 may monitor in real-time as the fluid power system operates a plurality of particle count parameters of the fluid at the first point and the second point on the flow path of the fluid monitoring device 32. The particle counting parameters are indicative as to a particle count status of the fluid as the fluid power system 10 operates. The particle counting parameters may provide trending of particle ingression into the fluid as operating and/or environmental conditions of the fluid power system 10 change.

The fluid monitoring device 32 may then determine when at least one particle counting parameter deviates from each corresponding particle count parameter threshold. The deviation of the at least one particle count parameter from the corresponding particle count parameter threshold is indicative that a quantity of particles included in the fluid is increasing. The fluid computing device 210 may generate the alert when the at least one particle counting parameter deviates from the corresponding particle counting parameter threshold that is indicative that the quantity of particles included in the fluid is increasing and is requiring corrective action to increase the quality of the fluid.

For example, the example threshold alert configuration 500 in FIG. 4, provides the status of the characteristic of the particle count of the fluid. The fluid computing device 210 may stream to the fluid monitoring computing device 230 the status of the particle count with regards to whether the particle count of the fluid has exceeded the corresponding particle count threshold and the fluid monitoring computing device 210 may display that status via the status particle count indicator 530. As the particle count of the fluid increases and continues to be at an increased level over a period of time, such an increase may be indicative that there may be an issue with contaminant egress, machine wear, and/or the fluid is possibly failing.

Thus, the fluid computing device 210 determines whether the particle count of the fluid has reached the corresponding particle count parameter threshold, and if so, streams to the fluid monitoring computing device 230 an alert that the particle count has exceeded the corresponding particle count parameter threshold. The fluid monitoring computing device 230 then displays the particle count status indicator 530 as "green" when the particle count remains below the corresponding particle count parameter threshold and then displays the particle count status indicator 530 as "red" as an alert when the particle count reaches the corresponding particle count parameter threshold. The fluid computing device 210 may also stream fluid data associated with the fluid to the fluid monitoring computing device 230 that the fluid monitoring computing device 230 may display. For example, the example threshold alert configuration 500 in FIG. 4, displays that the latest particle count measurement is 3.3 and was measured at 12:28 AM on Nov. 5, 2018.

In addition to generating the alert that the particle count of the fluid power system 10 has exceeded the corresponding particle count parameter threshold, the fluid computing device 210 may also assess in real-time the increase in particle count and determine at least one component that may be triggering the increase in particle count due to malfunctioning of the component. The fluid computing device 210 may then generate an indicator in real-time that indicates the at least one component and the component characteristics of the at least one component that could be triggering the increase in particle count. For example, the fluid computing device 210 may identify that the breather of the fluid power system 10 is failing and such a failure in the breather is triggering the increase in the particle count of the fluid. The fluid computing device 210 may then generate an indicator in real-time to the fluid monitoring computing device 230 that indicates that correction action should be executed to address the breather.

The fluid computing device 210 may alert several different users that may have interest when the different fluid parameters of the fluid deviate from the corresponding thresholds. For example, the fluid computing device 210 may alert the maintenance manager via the fluid monitoring computing device 230 of the maintenance manager. The fluid computing device 210 may alert the purchase department via the fluid monitoring computing device 230 of the purchase department. The fluid computing device 210 may alert the new order supply chain of the fluid distributor via the fluid monitoring computing device 230 of the fluid distributor. The fluid computing device 210 may alert the sales person of the fluid distributor via the fluid monitoring computing device 230.

The fluid computing device 210 may alert any user that has an interest in the fluid via the corresponding fluid monitoring computing device 230 when the fluid parameters of the fluid deviate from the corresponding thresholds that will be apparent to those skilled in the relevant art(s) without departing from the spirit and scope of the disclosure. The fluid computing device 210 may generate the alert to be displayed to the user via the fluid monitoring computing device 230 via Short Message Service (SMS) messaging, electronic mail, short range wireless communications, Multimedia Messaging Service (MMS) messaging, an Application Programming Interface (API) call and/or any other suitable communication approach that will be apparent to those skilled in the relevant art(s) without departing from the spirit and scope of the present disclosure.

In an embodiment, the fluid computing device 210 may generate the alert and provide the alert to an Enterprise Resource Planning (ERP) system of the maintenance team that is responsible for replacing the fluid when the fluid parameters of the fluid deviate from the corresponding thresholds. In doing so, the fluid computing device 210 may automatically alert the ERP that the fluid has issues and requires replacement. The ERP may then automatically generate an order for a new fluid to replace the fluid that has deviated from the thresholds and provide the order to the fluid distributor. The fluid distributor may then ship the new fluid such that the fluid that has deviated from the thresholds may be replaced without a disruption in down time for the fluid power system 10.

Returning to FIG. 2, fluid computing device 210 may identify associations between different fluid parameters and/or characteristics such that as different fluid parameters and/or characteristics deviate such that deviation in those fluid parameters and/or characteristics may trigger the deviations in other fluid parameters and/or characteristics. Typically, a deviation in a single fluid parameter and/or characteristic may trigger additional deviations in other fluid parameters and/or characteristics as the fluid parameters and/or characteristics of the fluid power system 10 are intertwined. Rather than analyze each fluid parameter and/or characteristic in isolation to determine when each fluid parameter and/or characteristic deviates beyond the corresponding threshold associated with each fluid parameter and/or characteristic, fluid computing device 210 may holistically analyze each fluid parameter and/or characteristics that deviates beyond the corresponding thresholds to determine the interrelationship of the fluid parameters and/or characteristics that have deviated beyond the corresponding thresholds.

The analyzation of the interrelationship of the fluid parameters and/or characteristics that have deviated beyond the corresponding thresholds enables fluid computing device 210 to deliver an increase in diagnostic analysis as to the source of the deviations with regard to the performance of the fluid power system 10. Rather than simply reporting a failure in the performance of the fluid power system 10 to the user, fluid computing device 210 may determine the interrelationship of the several different fluid parameters and/or characteristics that have deviated beyond the corresponding threshold. In doing so, fluid computing device 210 may provide to the user a more targeted diagnostic analysis of the performance of the fluid power system 10 such that the user may identify the source of the degradation of the performance of the fluid power system 10 with increased efficiency.

As noted above, the fluid monitoring device 32 includes a multi-variant sensor environment with numerous different sensors that monitor numerous different fluid parameters and/or characteristics of the fluid as the fluid continuously flows through the fluid power system 10 as the fluid power system 10 operates. Fluid computing device 210 may then monitor each of the numerous different fluid parameters and/or characteristics of the fluid as the fluid continuously flows through the fluid power system 10 as the fluid power system 10 operates in real-time. The monitoring of numerous different fluid parameters and/or characteristics of the fluid in real-time may enable the fluid computing device 210 to then determine the interrelationship of the different fluid parameters and/or characteristics that deviate from the corresponding thresholds.

Rather than requiring the user to begin a manual diagnostic process to determine source of the failure in the degradation of the performance of the fluid power system 10 which may trigger numerous hours of troubleshooting to identify, fluid computing device 210 may provide a more targeted diagnostic analysis to the user so that the user may efficiently identify the source of the degradation of the performance of the fluid power system 10. As a fluid parameter and/or characteristic deviates from the corresponding threshold due to a degradation in performance of the fluid power system 10, additional fluid parameters and/or characteristics may also deviate due to source of the degradation of performance in the fluid power system 10. The fluid parameters and/or characteristics that are interrelated to each other and interrelated to the source of the degradation of performance in the fluid power system 10 may then each deviate from the corresponding threshold in a ripple effect due to the source of the degradation of performance in the fluid power system 10.

Fluid computing device 210 in identifying the interrelationship of the different fluid parameters and/or characteristics that have deviated from the corresponding thresholds may then provide insight to the user as to the source of the degradation of performance in the fluid power system 10. Fluid computing device 210 may identify that the combination of fluid parameters and/or characteristics that have deviated from the corresponding thresholds are a combination of fluid parameters and/or characteristics that are associated with a specific source of degradation of performance in the fluid power system 10 when that combination of fluid parameters and/or characteristics differ from the corresponding thresholds. Thus, fluid computing device 210 may provide a more targeted diagnostic analysis to the user thereby providing the user with increased efficiency in identifying the source of degradation of performance in the fluid power system 10.

For example, fluid computing device 210 may interconnect the fluid parameters and/or characteristics of the fluid as the fluid continuously flows through the fluid power system 10 of pressure, temperature, viscosity, water saturation, relative humidity, FTIR, TAN, and/or oxidation. In such an example, fluid computing device 210 may first recognize that the water saturation of the fluid has increased beyond the water saturation threshold of the fluid thereby indicating to fluid computing device 210 that the water saturation level of the fluid has significantly increased beyond the water saturation threshold. The increase in the water saturation level of the fluid may then trigger the fluid chemistry to increase above the fluid chemistry threshold due to an increase of acid in the fluid due to an increase in the water saturation level of the fluid. Fluid computing device 210 may then identify that the fluid chemistry of the fluid has increased above the fluid chemistry threshold. The increase in the water saturation level of the fluid may then trigger the oxidation level to increase above the oxidation threshold due to an increase in oxygen in the fluid due to an increase in the water saturation level of the fluid thereby triggering oxidation in the fluid.

Fluid computing device 210 may then interconnect the increase in water saturation, fluid chemistry, and oxidation. In interconnecting the increase in water saturation, fluid chemistry, and oxidation, fluid computing device 210 may determine that moisture is getting into the fluid as the fluid continuously flows through the fluid power system 10 as the fluid power system 10 operates. Rather than simply identifying to the user that the performance of the fluid power system 10 has degraded causing the user to have to troubleshoot to identify why the performance of the fluid power system 10 has degraded, fluid computing device 210 may interconnect the increase in water saturation, fluid chemistry, and oxidation above the corresponding thresholds to identify to the user that moisture is getting into the fluid and thereby focus the diagnostic analysis to the user that moisture is getting into the fluid. In doing so, the user may target troubleshooting the source of the degradation of performance of the fluid power system 10 to moisture getting into the fluid.

In another example, fluid computing device 210 may interconnect the fluid parameters and/or characteristics of the fluid as the fluid continuously flows through the fluid power system 10 of metallic water debris, pressure, particle count, viscosity, and density. In such an example, fluid computing device 210 may first recognize that the particle count of the particles included in the fluid has increased beyond the particle count threshold of the fluid thereby indicating to fluid computing device 210 that the particle count of the fluid has significantly increased beyond the particle count threshold. As metal components of the fluid power system 10 wear such as valves, cylinders, pumps, and so on, the wear debris is distributed into the fluid thereby increasing the particle count of the fluid. The increase in the particle count level of the fluid may then trigger the metallic wear debris to increase above the metallic wear debris threshold due to an increase metallic wear debris in the fluid. Fluid computing device 210 may then identify that the viscosity of the fluid has increased above the viscosity threshold due to the increase of particles in the fluid. Fluid computing device 210 may then identify that the density of the fluid has increased above the density threshold due to the increase in the particles in the fluid.

Fluid computing device 210 may then interconnect the increase in particle count, metallic wear debris, viscosity, and density. In interconnecting the increase in particle count, metallic wear debris, viscosity, and density, fluid computing device 210 may determine metallic wear debris is being generated by a metallic component in the fluid power system 10. Fluid computing device 210 may then determine whether the metallic wear debris is ferrous or non-ferrous. Based on whether the metallic wear debris is ferrous or non-ferrous, the user may further identify the source of the metallic wear debris by focusing in on metallic components in the fluid power system 10 that have the type of metal wear debris identified in the fluid, such as a particular cylinder. The user may then further track the metallic components such as the particular cylinder to determine whether the pressure of the cylinder has deviated from when the cylinder was first installed and/or is there visible leakage coming from the cylinder and so on.

Rather than simply identifying to the user that the performance of the fluid power system 10 has degraded causing the user to have to troubleshoot to identify why the performance of the fluid power system 10 has degraded, fluid computing device 210 may interconnect the increase in particle count, wear metal debris, viscosity, and density above the corresponding thresholds to identify to the user that a metallic component of the fluid power system 10 is generating wear metal debris and that wear metal debris is being distributed into the fluid. In doing so, the user may target troubleshooting the source of degradation of performance of the fluid power system 10 to the metallic components of the fluid power system 10 that have similar metallic materials as the metallic wear debris being distributed into the fluid.

In another example, fluid computing device 210 may interconnect the fluid parameters and/or characteristics of the fluid as the fluid continuously flows through the fluid power system 10 of AC conductivity, fluid chemistry, dielectric properties, permittivity, electrochemistry, and FTIR. In such an example, fluid computing device 210 may first recognize that AC conductivity of the fluid ha increased beyond the AC conductivity threshold. Fluid computing device 210 may then identify that permittivity has increased above the permittivity threshold. Fluid computing device 210 may then identify that the oxidation of the fluid has increased above the oxidation threshold due to the increase in the particles in the fluid.

Fluid computing device 210 may then interconnect the increase in AC conductivity, permittivity, and oxidation. In interconnecting the increase in AC conductivity, permittivity, and oxidation, fluid computing device 210 may determine that air has been added to the fluid. Rather than simply identifying to the user that the performance of the fluid power system 10 has degraded causing the user to have to troubleshoot to identify why the performance of the fluid power system 10 has degraded, fluid computing device 210 may interconnect the increase in AC conductivity, permittivity, and oxidation to identity to the user that air has been added to the fluid. In doing so, the user may target troubleshooting the source of degradation of performance of the fluid power system 10 to the source of air being added to the fluid.

In an embodiment, a neural network 260 may assist the fluid computing device 210 in forecasting prediction dates associated with the fluid parameters of the fluid. Each prediction date predicts when the field status of the fluid is to indicate that a corresponding corrective action is to be executed to increase the quality of the fluid that is determined from the corresponding fluid parameters detected by the fluid monitoring device 32.

The fluid computing device 210 may accumulate the different fluid parameters of the fluid as the fluid continuously flows through the fluid power system 10. As fluid continuously flows through the fluid power system 10, the fluid computing device 210 may accumulate the different changes in each of the different fluid parameters of the fluid as the fluid continuously flows through fluid power system 10. In accumulating the different changes in the fluid parameters of the fluid as the fluid continuously flows through the fluid power system 10, such an accumulation of the different changes in the fluid parameters may be stored in fluid data server 220.

The fluid computing device 210 may then determine prediction dates for each of the different corrective actions that may be executed to increase the quality of the fluid. The accumulation of the changes in the different fluid parameters of the fluid as the fluid continuously flows through the fluid power system 10 that is stored in the fluid data server 220 may then be applied to the neural network 260. The neural network 260 may apply a neural network algorithm such as but not limited to a multilayer perceptron (MLP), a restricted Boltzmann Machine (RBM), a convolution neural network (CNN), and/or any other neural network algorithm that will be apparent to those skilled in the relevant art(s) without departing from the spirit and scope of the disclosure.

In doing so, the neural network 260 may then assist the fluid computing device 210 in forecasting the different prediction dates for each of the different corrective actions that are to be executed to increase the quality of the fluid based on the accumulated changes in the different fluid parameters of the fluid as the fluid continuously flows through the fluid power system 10. Each time that the different fluid parameters of the fluid change as the fluid continuously flows through the fluid power system 10, the neural network 260 may continue to accumulate each of the monitored changes in the different fluid parameters to further improve the accuracy of the fluid computing device 210 in determining the different prediction dates for each of the different corrective actions. In doing so, the neural network 260 may provide the forecast of the different prediction dates that each of the corrective actions are to be executed to the fluid computing device 210 and the fluid computing device 210 may generate the different prediction dates with increased accuracy as the changes in the different fluid parameters of the fluid as the fluid continues to flow through fluid power system 10 is accumulated. The fluid computing device 210 may then continue to learn.

The neural network 260 may also assist the fluid computing device 210 in determining the appropriate corrective action to execute when several of the fluid parameters indicate that different corrective actions may be executed to increase the quality of the fluid. Rather than the user having to pursue each different corrective action to determine whether each corrective action increases the quality of the fluid, the neural network 260 may assist the fluid computing device 210 to determine which corrective action to recommend to the user as compared to the other corrective actions that may be triggered due to the different fluid parameters deviating from their respective thresholds. The fluid data for associated with each possible corrective action may be accumulated as different corrective actions are triggered based on the different fluid parameters deviating from their respective thresholds. The fluid data may be data that is generated after each time the corrective action is executed and the impact to the quality of the fluid and the different fluid parameters is determined.

As the neural network 260 learns with the fluid data that is continuously accumulated as the different corrective actions are executed and the corresponding impact to the quality of the fluid and the different fluid parameters is determined, the neural network 260 may assist the fluid computing device 210 in evaluating the appropriate corrective action to execute when different corrective actions may be triggered based on numerous fluid parameters deviating from their corresponding thresholds.

For example, an electrochemistry sensor may detect the deviations in the threshold of numerous different fluid chemistry parameters. In such an example, the different fluid chemistry parameters may increase when the water included in the fluid is increased, the metal particles included in the fluid is increased, the viscosity increases, and so on. In doing so, several different corrective actions may be triggered based on the numerous deviations in the numerous different fluid chemistry parameters. Rather than having the user execute each of the different corrective actions to increase the quality of the fluid and to move the fluid chemistry parameters back into their respective thresholds, the neural network 260 based on the execution of past corrective actions and the impact on the corresponding fluid chemistry parameters may assist the fluid computing device 210 in determining the appropriate corrective action for the user to execute.

Figure 5:
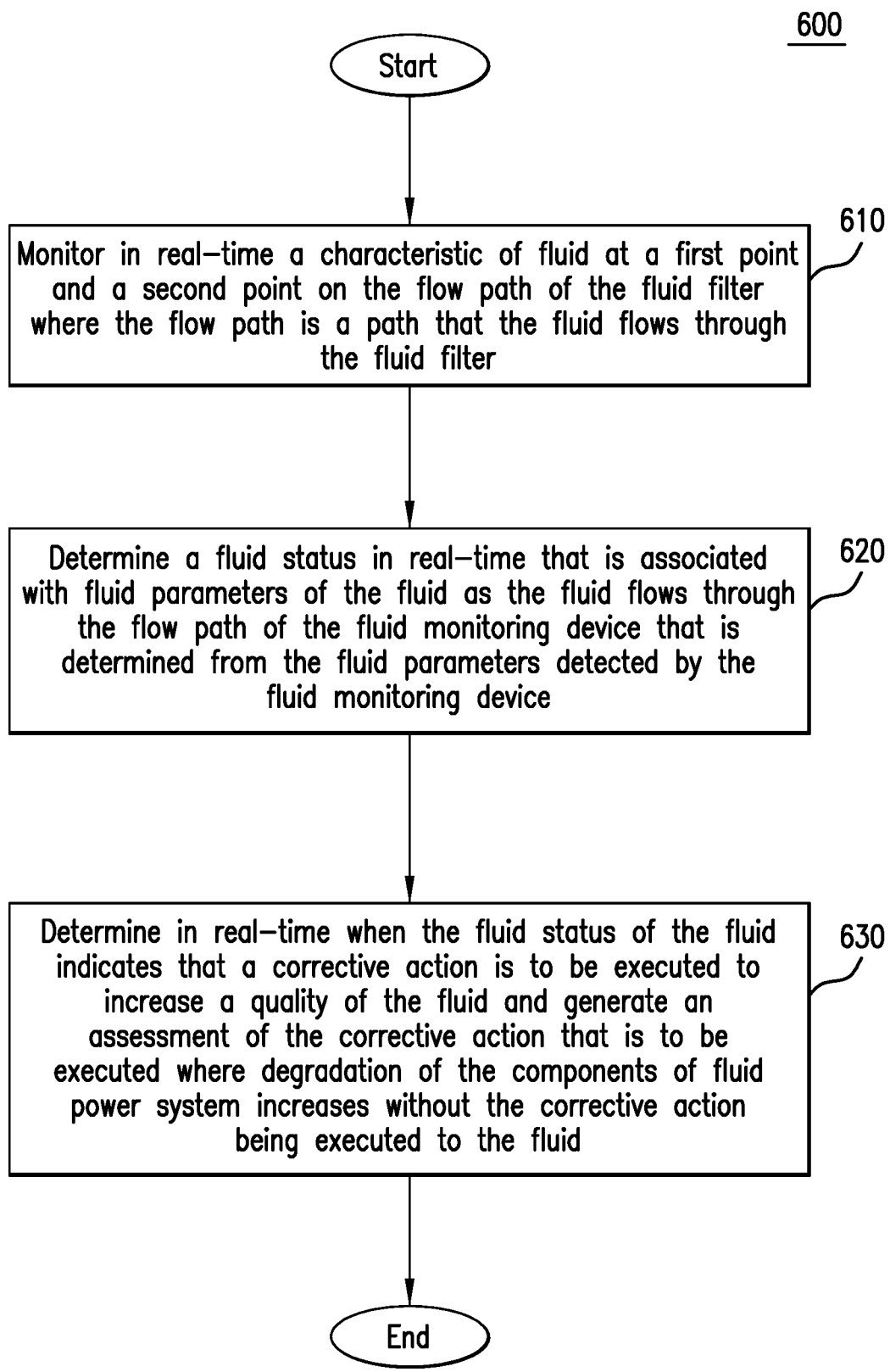
FIG. 5 is a flowchart of an exemplary process for determining fluid efficiency of a fluid according to one embodiment of the invention.

Referring now to FIG. 5, a flowchart is presented showing an exemplary process 600 for determining a fluid efficiency of a fluid that flows through a fluid power system. As shown in FIG. 5, process 600 begins at step 610, when a plurality of characteristics of a fluid is monitored in real-time at a first point and a second point of the fluid power system. The flow path is a path that the fluid flows through the fluid monitoring device that is couple to the fluid power system as the fluid flows through the fluid power system. For example, as shown in FIG. 1, the fluid monitoring device 32 may monitor a characteristic of fluid flow of a fluid, such as the temperature of the fluid at a first point and at a second point on a flow path of the fluid monitoring device 32. The flow path is a path that the fluid flows through the fluid monitoring device 32, as the fluid monitoring device 32 is coupled to the tank 20 of the fluid power system 10. As the characteristic of the fluid flow is monitored, the system may proceed to step 620 of process 600.

At step 620 of process 600, a fluid status is determined in real-time that is associated with the plurality of fluid parameters of the fluid as the fluid flows through the flow path of the fluid monitoring device that is determined from the plurality of fluid parameters detected by the fluid monitoring device. For example, as shown in FIG. 2, the fluid computing device 210 determines whether the fluid status of the fluid is indicative of a decreased quality of the fluid based on the particle count of the fluid as fluid flows through the fluid monitoring device 32 that is coupled to the tank 20. The system may then proceed to step 630 of process 600.

At step 630 of process 600, the fluid status of the fluid is determined in real-time when the fluid status of the fluid indicates that a corrective action is to be executed to increase a quality of the fluid and generating an assessment of the corrective action that is to be executed based on the fluid parameters detected by the fluid monitoring device 32. Degradation to components of the fluid power system 10 increases as the fluid flows through the fluid power system 10 without the corrective action being executed to the fluid. For example, the fluid computing device 210 determines in real-time when the fluid status of the fluid indicates that a corrective action is to be executed to increase the quality of the fluid, such as evaluating the whether different components are vibrating, and generating an assessment of the corrective action, such as which component is vibrating, based on the increase of metal in the fluid. The degradation to the components of the fluid power system increases as the fluid flows through the fluid power system 10 without addressing the vibration of the particular component.

While various aspects in accordance with the principles of the invention have been illustrated by the description of various embodiments, and while the embodiments have been described in considerable detail, they are not intended to restrict or in any way limit the scope of the invention to such detail. The various features shown and described herein may be used alone or in any combination.

Additional advantages and modifications will readily appear to those skilled in the art. The invention in its broader aspects is therefore not limited to the specific details and representative devices shown and described. Accordingly, departures may be made from such details without departing from the scope of the general inventive concept.

What is claimed is:

1. A method for determining a fluid status of a fluid that flows through a fluid power system, comprising:

monitoring in real-time, by a fluid monitoring device, a plurality of characteristics of a fluid on a flow path of a fluid monitoring device that is coupled to the fluid power system, wherein the flow path is a path that the fluid flows through the fluid monitoring device that is coupled to the fluid power system as the fluid flows through the fluid power system;

converting, by a fluid computing device, the characteristics monitored by the fluid monitoring device to a plurality of fluid parameters of the fluid based on fluid data associated with the characteristics as the fluid flows through the flow path of the fluid monitoring device, wherein each fluid parameter is indicative to a root cause malfunction of the fluid power system when each fluid parameter deviates from a corresponding threshold;

determining, by the fluid computing device, the fluid status in real-time that is associated with the plurality of fluid parameters of the fluid as the fluid flows through the flow path of the fluid monitoring device that is determined from the fluid parameters converted from the characteristics monitored by the fluid monitoring device based on the fluid data associated with the characteristics; and determining in real-time, by the fluid computing device, when the fluid status of the fluid indicates that a corrective action is to be executed to increase a quality of the fluid and generating an assessment of the corrective action that is to be executed based on the fluid parameters, wherein degradation to components of the fluid power system increases as the fluid flows through the fluid power system without the corrective action being executed to the fluid.

2. The computer implemented method of claim 1, further comprising:

assessing in real-time the fluid parameters that are triggered from the characteristics of the fluid as the fluid power system operates to determine at least one component and at least one component characteristic associated with the at least one component that impacts the fluid parameters as the at least one component operates in the fluid power system; and generating an indicator in real-time that indicates the at least one component that is to be targeted by the corrective action to increase the quality of the fluid based on the impact of the at least one component characteristic on the fluid parameters as the at least one component operates.

3. The method of claim 2, further comprising:

generating an alert when the fluid status for the fluid indicates that the corrective action is to be executed to increase the quality of the fluid and providing the assessment of the corrective action that is to be executed based on the fluid parameters detected by the fluid monitoring device.

4. The computer implemented method of claim 3, further comprising:
continuously monitoring the characteristics as the fluid flows through the fluid monitoring device;
forecasting a plurality of prediction dates associated with the fluid parameters of the fluid as the fluid flows through the fluid monitoring device, wherein each prediction date predicts when the field status of the fluid is to indicate that a corresponding corrective action is to be executed to increase the quality of the fluid that is determined from the corresponding fluid parameters detected by the fluid monitoring device; and
generating a plurality of alerts to indicate each prediction date that the corresponding corrective action is to be executed to increase the quality of the fluid.

5. The computer implemented method of claim 4, further comprising:
determining at least one fluid parameter from the plurality of fluid parameters detected by the fluid monitoring device that is indicative as triggering the corresponding corrective action to be executed to increase the quality of the fluid when at least one fluid parameter deviated from a corresponding threshold, wherein the deviation of the at least one fluid parameter from the corresponding threshold triggers a plurality of corrective actions to be executed to move the at least one fluid parameter to within the corresponding threshold; and
identifying the corresponding corrective action from the plurality of corrective actions to be executed to move the at least one fluid parameter to be within the corresponding threshold.

6. The computer implemented method of claim 3, further comprising:
monitoring in real-time as the fluid power system operates a plurality of fluid power system parameters of the fluid at a first point and a second point on the flow path of the fluid monitoring device, wherein each fluid power system parameter is an indicator as to an operation status of the fluid power system as the fluid power system operates based on whether each fluid power system parameter deviates from each corresponding fluid power system parameter threshold;
determining when at least one fluid power system parameter deviates from the at least one corresponding fluid power system parameter threshold, wherein the deviation of the at least one fluid power system parameter from the corresponding fluid power system threshold indicates that the operation status of the fluid power system requires corrective action to increase the quality of the fluid; and
generating the alert to indicate that the operation status of the fluid power system requires corrective action to increase the quality of the fluid when the at least one fluid power system parameter deviates from the at least one corresponding fluid power system parameter threshold.

7. The method of claim 3, further comprising:
monitoring in real-time as the fluid power system operates a plurality of fluid chemistry parameters of the fluid at a first point and the second point on a flow path of the fluid monitoring device, wherein each fluid chemistry parameter is indicative as to an electro-chemistry status of the fluid as the fluid power system operates based on whether each fluid chemistry parameter deviates from each corresponding fluid chemistry parameter threshold;
determining when the at least one fluid chemistry parameter deviates from the at least one corresponding fluid chemistry parameter threshold, wherein the deviation of the at least one fluid chemistry parameter from the at least one corresponding fluid chemistry parameter threshold is indicative that a quality of the fluid is decreasing and is requiring corrective action to increase the quality of the fluid; and
generating the alert when the at least one fluid chemistry parameter deviates from the at least one corresponding fluid chemistry parameter threshold that is indicative that the quality of the fluid is decreasing and is requiring corrective action to increase the quality of the fluid.

8. The method of claim 3, further comprising:
monitoring in real-time as the fluid power system operates a metallic wear debris parameter of the fluid at a first point and a second point on the flow path of the fluid monitoring device, wherein the metallic wear debris parameter is indicative as to a metallic debris status of the fluid as the fluid power system operates;
determining when the metallic wear debris parameter deviates from the metallic wear debris parameter threshold, wherein the deviation of the metallic wear debris parameter from the metallic wear debris parameter is indicative that a quantity of metallic debris included in the fluid is increasing; and
generating the alert when the metallic wear debris parameter deviates from the metallic wear debris parameter threshold that is indicative that the quantity of metallic debris included in the fluid is increasing.

9. The method of claim 3, further comprising:
monitoring in real-time as the fluid power system operates a particle counting parameter of the fluid at a first point and a second point on the flow path of the fluid monitoring device, wherein the particle counting parameter is indicative as to a particle count status of the fluid as the fluid power system operates;
determining when the particle counting parameter deviates from the particle count parameter threshold, wherein the deviation of the particle count parameter from the particle count parameter threshold is indicative that a quantity of particles included in the fluid is increasing; and
generating the alert when the particle counting parameter deviates from the particle counting parameter threshold that is indicative that the quantity of particles included in the fluid is increasing.

10. The computer implemented method of claim 1, further comprising:
generating a visual graph that depicts how the characteristics deviate for a fluid filter over an extended period of time.

11. A system for determining a fluid status of a fluid that flows through a fluid power system, comprising:
a fluid monitoring device that is coupled to the fluid power system and is configured to monitor in real-time a plurality of characteristics of a fluid on a flow path of the fluid monitoring device as the fluid flows through the fluid power system; and
a fluid computing device that is configured to:
convert the characteristics monitored by the fluid monitoring device to a plurality of fluid parameters of the fluid based on fluid data associated with the characteristics as the fluid flows through the flow path of the fluid monitoring device, wherein each fluid parameter is indicative to a root cause malfunction of the fluid power system each fluid parameter deviates from a corresponding threshold, determine the fluid status in real-time that is associated with a plurality of fluid parameters of the fluid as the fluid flows through the flow path of the fluid monitoring device that is determined from the fluid parameters converted from the characteristics monitored by the fluid monitoring device based on the fluid data associated with the characteristics, and determine in real-time when the fluid status of the fluid indicates that a corrective action is to be executed to increase a quality of the fluid and generate an assessment of the corrective action that is to be executed based on the fluid parameters, wherein degradation to components of the fluid power system increases as the fluid flows through the fluid power system without the corrective action being executed to the fluid.

12. The system of claim 11, wherein the fluid computing device is further configured to:

assess in real-time the fluid parameters that are triggered from the characteristics of the fluid as the fluid power system operates to determine at least one component and at least one component characteristic associated with the at least one component that impacts the fluid parameters as the at least one component operates in the fluid power system; and generate an indicator in real-time that indicates that at least one component that is to be targeted by the corrective action to increase the quality of the fluid based on the impact of the at least one component characteristic on the fluid parameters as the at least one component operates.

13. The system of claim 12, wherein the fluid computing device is further configured to:

generate an alert when the fluid status for the fluid indicates that the corrective action is to be executed to increase the quality of the fluid and providing the assessment of the corrective action that is to be executed based on the fluid parameters detected by the fluid monitoring device.

14. The system of claim 13, wherein the fluid monitoring device is further configured to continuously monitor the characteristics as the fluid flows through the fluid monitoring device.

15. The system of claim 14, wherein the fluid computing device is further configured to:

forecast a plurality of prediction dates associated with the fluid parameters of the fluid as the fluid flows through the fluid monitoring device, wherein each prediction date predicts when the field status of the fluid is to indicate that a corresponding corrective action is to be executed to increase the quantity of the fluid that is determined from the corresponding fluid parameters detected by the fluid monitoring device; and generate a plurality of alerts to indicate each prediction date that the corresponding corrective action is to be executed to increase the quality of the fluid.

16. The system of claim 15, wherein the fluid computing device is further configured go:

determine at least one fluid parameter from the plurality of fluid parameters detected by the fluid monitoring device that is indicative as triggering the corresponding corrective action to be executed to increase the quality of the fluid when at least one fluid parameter deviated from a corresponding threshold, wherein the deviation of the at least one fluid parameter from the corresponding threshold triggers a plurality of corrective actions to be executed to move the at least one fluid parameter to within the corresponding threshold; and identify the corresponding corrective action from the plurality of corrective actions to be executed to move the at least one fluid parameter to be within the corresponding threshold.

17. The system of claim 13, wherein the fluid monitoring device is further configured to:

monitor in real-time as the fluid power system operates a plurality of fluid power system parameters of the fluid at a first point and a second point on the flow path of the fluid monitoring device, wherein each fluid power system parameter is an indicator as to an operation status of the fluid power system as the fluid power system operates based on whether each fluid power system parameter deviates from each corresponding fluid power system threshold.

18. The system of claim 17, wherein the fluid computing device is further configured to:

determine when at least one fluid power system parameter deviates from the at least one corresponding fluid power system parameter threshold, wherein the deviation of the at least one fluid power system parameter from the corresponding fluid power system threshold indicates that the operation status of the fluid power system is requires corrective action to increase the quality of the fluid; and generate an alert to indicate when the operation status of the fluid power system requires corrective action to increase the quality of the fluid when the at least one fluid power system parameter deviates from the at least one corresponding fluid power system parameter threshold.

19. The system of claim 13, wherein the fluid monitoring device is further configured to:

monitor in real-time as the fluid power system operates a plurality of fluid chemistry parameters of the fluid at a first point and a second point on the flow path of the fluid monitoring device, wherein each fluid chemistry parameter is indicative as to an electro-chemistry status of the fluid as the fluid power system operates based on whether each fluid chemistry parameter deviates from each corresponding fluid chemistry parameter threshold.

20. The system of claim 19, wherein the fluid computing device is further configured to:

determine when the at least one fluid chemistry parameter deviates from the at least one corresponding fluid chemistry parameter, wherein the deviation of the at least one fluid chemistry parameter from the at least one corresponding fluid chemistry parameter threshold is indicative that a quality of the fluid is decreasing and is requiring corrective action to increase the quality of the fluid; and generate the alert when the at least one fluid chemistry parameter deviates from the at least one corresponding fluid chemistry parameter threshold that is indicative that the quality of the fluid is decreasing and is requiring corrective action to increase the quality of the fluid.

21. The system of claim 13, wherein the fluid monitoring device is further configured to:

monitor in real-time as the fluid power system operates a metallic wear debris parameter of the fluid at a first point and a second point on the flow path of the fluid monitoring device, wherein the metallic wear debris parameter is indicative as to a metallic debris status of the fluid as the fluid power system operates.

22. The system of claim 21, wherein the fluid computing device is further configured to:
   determine when the metallic wear debris parameter deviates from the metallic wear debris parameter threshold, wherein the deviation of the metallic wear debris parameter from the metallic wear debris parameter is indicative that a quantity of metallic debris included in the fluid is increasing; and
   generate the alert when the metallic wear debris parameter deviates from the metallic wear debris parameter threshold that is indicative that the quantity of metallic debris included in the fluid is increasing.

23. The system of claim 13, wherein the fluid monitoring device is further configured to:
   monitor in real-time as the fluid power system operates a particle counting parameter of the fluid at a first point and a second point on the flow path of the fluid monitoring device, wherein the particle counting parameter is indicative as to a particle count status of the fluid as the fluid power system operates.

24. The system of claim 23, wherein the fluid computing device is further configured to:
   determine when the particle counting parameter deviates from the particle count parameter threshold, wherein the deviation of the particle count parameter from the parameter count parameter threshold is indicative that a quantity of particles included in the fluid is increasing; and
   generate the alert when the particle counting parameter deviates from the particle counting parameter threshold that is indicative that the quantity of particles included in the fluid is increasing.

25. The system of claim 11, wherein the fluid computing device is further configured to generate a visual graph that depicts how the characteristics deviate for a fluid filter over an extended period of time.

* * * * *